United States Patent [19]
Alvarez et al.

[11] 3,867,375
[45] Feb. 18, 1975

[54] REAGENTS FOR PREPARING AND METHOD OF PREPARING PROSTAGLANDINS

[75] Inventors: Francisco S. Alvarez, Sunnyvale; Arthur F. Kluge; John H. Fried, both of Palo Alto, all of Calif.

[73] Assignee: Syntex (U.S.A.) Inc., Palo Alto, Calif.

[22] Filed: May 12, 1972

[21] Appl. No.: 252,725

[52] U.S. Cl............. 260/240 R, 424/283, 424/305, 260/345.9, 260/438.1, 260/468 D, 260/514 D
[51] Int. Cl............................................. C07c 61/20
[58] Field of Search......... 260/240 R, 468 D, 514 D

[56] References Cited
OTHER PUBLICATIONS

Sih, et al., I, J. Chem. Soc., Chem. Commun. 1972, pp. 240 to 241, Relied on as Abst. in CA Vol. 77, Abst. 19234r (1972).

Sih, et al., II, Journal of the Am. Chem. Soc., Vol. 94, pp. 3643 to 3644 (1972).

Sih, et al., III, Tetrahedron Letters No. 24, pages 2435 to 2437(1972).

Kluge, et al., Journ. of the Am. Chem. Soc., Vol. 94, pages 7827 to 7832 (1972).

*Primary Examiner*—John D. Randolph
*Attorney, Agent, or Firm*—Gerard A. Blaufarb; Lawrence S. Squires; William B. Walker

[57] ABSTRACT

Octenol ether copper$^{(1)}$ lithium reagents which are useful in preparing prostaglandin derivatives and methods of preparing such reagents and methods of preparing prostaglandin derivatives using such reagents. The prostaglandin derivatives exhibit prostaglandin-like pharmacological properties and thus are useful where such agents are indicated.

15 Claims, No Drawings

REAGENTS FOR PREPARING AND METHOD OF PREPARING PROSTAGLANDINS

BACKGROUND OF THE INVENTION

1. The Invention

This invention relates to methods of preparing prostaglandins and prostaglandin derivatives. In a further aspect, this invention relates to octenol ether copper[(I)] lithium reagents and methods of preparing such reagents. In a still further aspect, this invention relates to racemic octenol ether copper[(I)] lithium reagents and also optically active (S)-octenol ether copper[(I)] lithium reagents. In another aspect, this invention relates to methods of preparing prostaglandin derivatives and prostaglandins using racemic or (S) optically active octenol ether copper[(I)] lithium reagents.

2. The Prior Art

Prostaglandins are a group of chemically related 20-carbon chain hydroxy fatty acids having the basic skeleton of prostanoic acids:

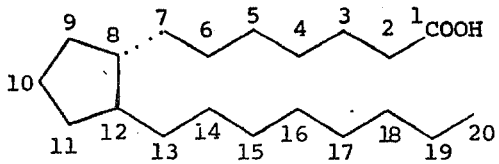

The prostaglandins having a keto group at the C-9 position are known as the PGE series, those having a hydroxyl group in place of the keto group are known as the PGF series and are further designated by an α or β suffix to indicate the configuration of the hydroxyl group at said position. The natural compounds are the α-hydroxy substituted compounds. They may contain different degrees of unsaturation in the molecule, particularly at C-5, C-13 and C-17, the unsaturation is also indicated by a suffix. For a review on prostaglandins and the definition of primary prostaglandins, see for example S. Bergstrom, Recent Progress in Hormone Research 22, pp. 153–175 (1966) and Science 157, page 382 (1967) by the same author.

Prostaglandins are widely distributed in mammalian tissues and have been isolated from natural sources in very small amounts. In addition a number of the natural occurring prostaglandins have been prepared by chemical synthesis; note, for example, J. Am. Chem. Soc. 91, 5675 (1969), J. Am. Chem. Soc. 92, 2586 (1970) and J. Am. Chem. Soc. 93, 1489–1493 (1971) and references cited therein, W. P. Schneider, et al., J. Am. Chem. Soc. 90, 5895 (1968), U. Axen, et al., Chem. Commun., 303 (1969), and W. P. Schneider, Chem. Commun. 304 (1969).

Because of the remarkable range of biological and pharmacological properties exhibited by this family of compounds, a great deal of interest has focused upon such compounds and accordingly we have discovered felicitous and selective syntheses and reagents for preparing prostaglandins and prostaglandin derivatives.

SUMMARY OF THE INVENTION

In summary the octenol ether copper[(I)] lithium reagent, of the invention, comprises a complexed (dl)- or optically active (S)-trans-1-octen-3-ol 3-ether copper[(I)] lithium in a suitable inert organic solvent mixture.

In summary the process, of the invention, for preparing the octenol ether copper[(I)] lithium reagent comprises (1) preparing a first solution by the admixture of a suitable alkyl lithium with a (dl)- or (S)-1-iodo-trans-1-octen-3-ol 3-ether in a suitable inert organic solvent under controlled conditions; (2) preparing a copper[(I)] salt solution in a suitable inert organic solvent; (3) admixing a complexing agent with either the first solution or with the copper salt solution depending on the particular complexing agent and provided that a complexing agent is not already inherently present in the copper salt solution; and (4) admixing the first solution with the copper salt solution under controlled conditions.

In summary, the process of our invention for preparing prostaglandin derivatives comprises treating a 2-(6-carboalkoxy-hexyl)-1-oxo-cyclopent-2-ene, or 4-hydroxy ethers thereof, with the complexed octenol ether copper[(I)] lithium reagent in an inert organic solvent mixture, under reactive conditions, to obtain the corresponding 11-desoxy-prostaglandin 15-ether derivatives or the corresponding 11-ethers thereof.

The invention will be further described herein below.

FURTHER DESCRIPTION OF THE INVENTION AND PREFERRED EMBODIMENTS

The octenol ether copper[(I)] lithium reagent of the invention is a mixture consisting essentially of (dl) and/or optically active (S) isomers of compounds having the formulas:

and

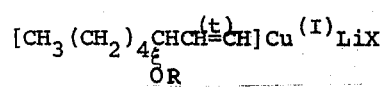

wherein the (t) over the double bond indicates the trans configuration; X is a halide; OR is an acid labile ether and the wavy line indicates either a (dl) mixture with respect to this asymmetric center or the optically active (S) isomer;

complexed by an electron-rich neutral complexing reagent, which coordinates with transition metals, in a suitable inert solvent mixture.

Typically, and preferably, the compounds of the above formulas are either a racemic (dl) mixture or the pure (S) optically active isomer. The optically active (S) isomer is especially preferred as it yields a selective prostaglandin derivative product with respect to the corresponding asymmetric center. Also where it is desired to use the octenol ether copper[(I)] lithium reagent to produce a prostaglandin ether derivative having an easily cleavable 15-ether group, the preferred OR groups are 2′-methoxyprop-2′-oxy and tetrahydropyranyl-2′-oxy. Where it is desired to produce a prostaglandin ether derivative having a stable 15-ether group, the preferred OR group is methoxymethoxy.

Suitable halides are fluoride, chloride, bromide, and iodide. The preferred halide is iodide. Suitable inert solvent mixtures include, for example, mixtures of a suitable ether solvent. Suitable alkane solvents include, for example, pentane, hexane, heptane, and the like. Suitable ether solvents include diethyl ether, methyl ethyl ether and the like. The preferred solvent mixture is a mixture of hexane and diethyl ether. Typically, a solvent concentration in the range of about from 0.5 to 50 wt. %, preferably 2 to 10%, based on the octenol ether component is used. However, the particular solvent concentration used is largely a matter of convenience and concentrations both above and below this range can also be used.

Suitable complexing reagents include, for example;

1. alkylalkylenediamines having the formula $R_1'R_2'N—(CH_2)_n—NR_3'R_4'$ wherein $n$ is the whole integer 2 or 3, and $R_1'$, $R_2'$, $R_3'$ and $R_4'$ are independently selected from the group of alkyls having from one through four carbon atoms. Thus, suitable alkylalkylenediamines include, for example, N,N,N',N'-tetramethylmethylenediamine and N,N,N',N'-tetramethylpropylenediamines, etc.;

2. naphthalene bridge diamines having the formula:

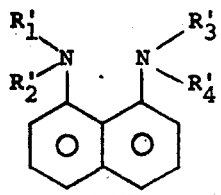

wherein $R_1'$, $R_2'$, $R_3'$ and $R_4'$ are as defined herein above;

3. alkylpiperazines having the formula:

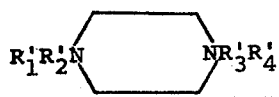

wherein $R_1'$, $R_2'$, $R_3'$ and $R_4'$ are as defined herein above;

4. polycyclic diazoheterocyclics such as, for example, sparteine; and the like; (5) trialkyl ($C_1$ through $C_4$) phosphites such as, for example, trimethylphosphite; triethylphosphite; tri(n-propyl)phosphite; triisopropylphosphite; tri(n-butyl)phosphite; triisobutylphosphite; and the like; trialkyl ($C_1$ through $C_4$) phosphines such as, for example, trimethylphosphine; tri(n-propyl)phosphine; triisopropylphosphine; triisobutylphosphine; tri(n-butyl)phosphine; triethylphosphine; and the like; combination complexing reagent-copper salts such as, for example, bis-(trimethylphosphite) copper$^{(1)}$ iodide and the like.

The preferred complexing reagents are tetraalkylalkylenediamines, as defined above, trialkylphosphites selected from the group consisting of trimethylphosphite, triethylphosphite, tri(n-propyl)phosphite, triisopropylphosphite, tri(n-butyl)phosphite, and triisobutylphosphite; trialkylphosphines selected from the group consisting of trimethylphosphine, triethylphosphine, tri(n-propyl)phosphine, triisopropylphosphine, tri(n-butyl)phosphine and triisobutylphosphine; and the combination complexing reagent and copper$^{(1)}$ halide salt, bis(trimethylphosphite) copper$^{(1)}$ iodide. The especially preferred complexing reagents are N,N,N',N'-tetramethylethylenediamine; trimethylphosphite; tri(n-butyl)phosphine and bis(trimethylphosphite) copper$^{(1)}$ iodide.

As used herein above and below, the following terms have the following meanings unless expressly stated to the contrary. The term alkyl includes both straight chain and branched chain alkyl groups having from one through ten carbon atoms. The term lower alkyl refers to both straight chain and branched chain alkyl groups having from one through six carbon atoms. The term lower alkoxy refers to the group —OR'' wherein R'' is lower alkyl. The term cycloalkyl refers to cycloalkyl groups having from five through seven carbon atoms such as, for example, cyclopentyl, cyclohexyl and the like.

The term acid labile ether refers to those acid labile ether groups which can be cleaved by mild acid hydrolysis, and preferably having from two through ten carbon atoms. Typical acid labile ether groups include, for example, methoxymethoxy; 1'-methoxyethoxy; 1'-ethoxyethoxy; phenoxymethoxy; 2'-methoxyprop-2'-oxy; tetrahydropyranyl-2'-oxy; tetrahydrofuran-2'-oxy; 2'-butoxyprop-2'-oxy; 1'-pent-1'''-oxycyclohexyl-1'-oxy; and the like.

The terms acid and base labile acyloxy groups and acid and base hydrolyzable acyl groups refer to acid labile esters and acyl groups and base labile ester and acyl groups conventionally employed in the art, preferably those derived from carboxylic acids of one to 12 carbon atoms. Typical hydrolyzable acyl groups thus include acetyl, propionyl, butyryl, t-butyryl, valeryl, isovaleryl, hexanoyl, heptanoyl, octanoyl, nonanoyl, undecanoyl, lauroyl, benzoyl, p-methoxybenzoyl, p-nitrobenzoyl, phenylacetyl, phenylpropionyl, o-, m-, p-methylbenzoyl, β-cyclopentylpropionyl, dihydrocinnanyl, and the like.

The term complexing reagent refers to electron-rich neutral substances, commonly referred to as ligands, which are capable of coordination with transition metals. Typical ligands include, for example, tertiary amines, phosphines, phosphites, sulfides, cyanides, isonitriles and the like.

The term halide refers to fluoride, chloride, bromide, and iodide.

The prostaglandin and prostaglandin derivatives have been described herein above and below, as prostanoic acid derivatives. The term prostanoic acid refers to the structural configuration indicated herein above in the Prior Art discussion (page 2).

The term (dl) refers generally to racemic mixtures and where used as a prefix to a particular isomer structure, or word formula, it designates a racemic mixture of the indicated isomer and its mirror image. Thus, for example, the formula (dl)-9-oxo-11α-hydroxy-15α-hydroxy-prost-trans-13-enoic acid refers to an equal mixture of the indicated structure and its mirror image:

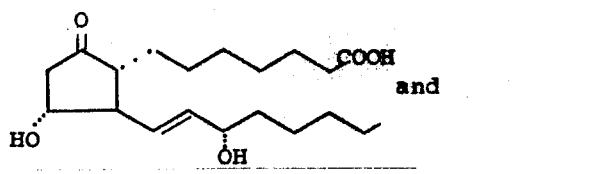

and

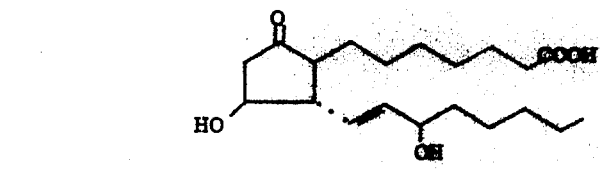

mirror image wherein the dotted bond line indicates the α configuration and the solid bond line indicates the β configuration.

With respect to non-mirror image isomers, the designation retro has been used. The term retro designates an isomer wherein the substituent at each asymmetric center has the opposite configuration to the preceding isomer, except those designated as epi. Thus, for example, 9-oxo-11α-hydroxy-15α-hydroxy-prost-trans-13-enoic acid has the structural configuration:

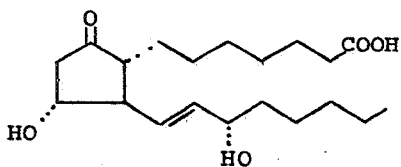

and accordingly retro-9-oxo-11α-hydroxy-15-epihydroxy-prost-trans-13-enoic acid refers to the structural configuration:

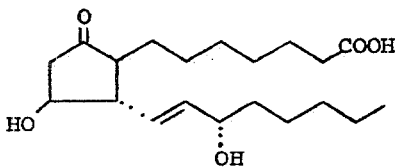

Considering now our process for preparing the octenol ether copper$^{(I)}$ lithium reagent, in greater depth, it is essential that the process be conducted by preparing two distinct sub-component solutions, one containing the octenol ether lithium component and one containing the copper$^{(I)}$ component and then admixing these solutions under controlled conditions. In addition, a particular one of the sub-component solutions must also contain the complexing reagent, depending on the particular complexing agent used.

Accordingly, considering the process in detail, the octenol ether and lithium sub-component solution can be prepared by admixing a suitable alkyl lithium with a suitable iodo octenol ether in a suitable solvent at temperatures in the range of about from $-100°$ to $-50°C$ for about from one to sixty minutes. Preferably, this treatment is conducted at $-78°C$ for about from 20 to 40 minutes. Suitable alkyl lithiums include methyl lithium, ethyl lithium, n-propyl lithium and n-butyl lithium; and preferably n-butyl lithium. Suitable iodo octenol ethers which can be used, either as racemic (dl) mixtures or as the pure (S) optically active isomer, are those having the formula:

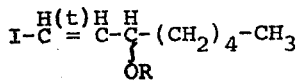

wherein the (t) over the double bond indicates the trans configuration; —OR is selected from the group consisting of acid labile ethers, and the wavy bond line indicates an asymmetric carbon center and indicates both the (dl) racemic mixture or the individual (S) optically active isomer.

Also, mixtures of the (dl)-1-iodo-trans-1-octen-3-ol 3-ether and (S)-1-iodo-trans-1-octen-3-ol 3-ether can be used, though typically this would not be desirable as the primary advantage of the (S)-reagent is its optical selectivity; which would be wasted by mixture with the (dl)-reagent. Accordingly, the pure (S)-1-iodo-trans-1-octen-3-ol 3-ethers are preferred. Also, mixtures of different 3-ethers of (dl)-1-iodo-1-octen-3-ol or (S)-1-iodo-1-octen-3-ol could be used.

The preferred iodo octenol ethers are:
(dl)-1-iodo-3-(2'-methoxyprop-2'-oxy)-trans-1-octene;
(S)-1-iodo-3-(2'-methoxyprop-2'-oxy)-trans-1-octene;
(dl)-1-iodo-3-(tetrahydropyranyl-2'-oxy)-trans-1-octene;
(S)-1-iodo-3-(tetrahydropyranyl-2'-oxy)-trans-1-octene;
(dl)-1-iodo-3-methoxymethoxy-trans-1-octene; and
(S)-1-iodo-3-methoxymethoxy-trans-1-octene.

Accordingly becaause of the isomeric selectivity, the particularly preferred iodo octenol ethers are:
(S)-1-iodo-3-(2'-methoxyprop-2'-oxy)-trans-1-octene;
(S)-1-iodo-3-(tetrahydropyranyl-2'-oxy)-trans-1-octene; and
(S)-1-iodo-3-methoxymethoxy-trans-1-octene.

Also, as previously noted, the 2'-methoxyprop-2'-oxy and tetrahydropyranyl-2'-oxy will yield prostaglandin ether derivatives having easily cleavable 15-ether groups, whereas the methoxymethoxy ether group yields prostaglandin ether derivatives having stable 15-ether groups.

Also, as this treatment and also subsequent treatments are conducted at substantially reduced temperatures, it is necessary that the inert organic solvent have a melting point below the particular treatment temperature used, to ensure that the liquid state is retained. Suitable solvents include alkane solvents having a melting point below the particular treatment temperature used. Thus, by increasing the treatment temperatures a slightly broader range of solvents can be used. Suitable alkane solvents which are operable throughout the $-50°$ to $-100°C$ range include, for example, pentane, hexane, heptane and the like. Typically, best results are obtained using hexane.

The copper component solution can be prepared by dissolving a copper$^{(I)}$ halide salt in a suitable inert organic solvent. Typically, the treatment is conducted at about from 0° to 30°C. The particular temperature used is not critical with respect to this treatment, however, as the ultimate mixing step is conducted at reduced temperatures (i.e. $-80°$ to $-20°C$) it is necessary that the inert solvent have a melting point below the temperature used in the ultimate mixing step. Suitable solvents include ether solvents having melting points below the temperature used in the ultimate mixing step. Suitable ether solvents include, for example, diethyl ether, methyl ethyl ether, and the like. Best results are typically obtained using diethyl ether. Suitable copper$^{(I)}$ halides which can be used include copper$^{(I)}$ iodide, copper$^{(I)}$ fluoride, copper$^{(I)}$ chloride, and copper$^{(I)}$ bromide. Best results are obtained using copper$^{(I)}$ iodide. Typically, a copper$^{(I)}$ halide salt solvent concentration in the range of about from 0.5 to 50 wt. %, preferably 2 to 10%, is used, though again this is largely a matter of convenience and concentrations both above and below this can also be used.

As noted above, the complexing reagent must be present, in particular one of the sub-component solutions, prior to their admixture together. Thus, where a combination complexing reagent-copper$^{(I)}$ halide (e.g.

bis-(trimethylphosphite)copper$^{(I)}$ iodide is used, the complexing reagent is inherently present in the copper$^{(I)}$ sub-component solution and the copper component solution can be prepared in the same manner as described above but merely replacing the copper$^{(I)}$ halide with the combination complexing reagent copper$^{(I)}$ halide.

Where a trialkyl phosphite or trialkyl phosphine complexing reagent is used, the complexing agent is added to the copper$^{(I)}$ halide solution. This addition can take place either before or after the addition of the copper$^{(I)}$ salt to the solvent and typically the copper$^{(I)}$ salt and phosphite or phosphine complex are added at about the same time. Suitable phosphite and phosphine complexing agents include trimethyl phosphite, triethyl phosphite, tri(n-propyl)phosphite, and tri(n-butyl) phosphite; trimethyl phosphine, triethyl phosphine, tri(n-propyl)phosphine, and tri(n-butyl)phosphine. Typically, better results are obtained with the phosphite complexing reagents than the phosphine complexing reagents. The preferred phosphite complexing reagent is trimethyl phosphite and the preferred phosphine complexing reagent is tri(n-butyl)-phosphine.

Where a diamine type complexing reagent (e.g. tetraalkylalkylenediamines; naphthalene bridge diamines, alkylpiperazines and the like) is used, the complexing agent is added to the octenol ether lithium solution and must be added to the product solution (i.e., after the addition of the desired alkyl lithium and iodo trans octenol ether and after the solution has been allowed to stand as described above). In this case, the addition of complexing agent is typically conducted at temperatures in the range of about from $-100°$ to $-50°C$, preferably about $-78°C$ for about from 20 to 40 minutes. Preferably, the diamine complexing agent is a tetraalkylalkylenediamine, as previously described. Best results are typically obtained using N,N,N',N'-tetramethylethylenediamine.

Where the copper$^{(I)}$ iodide solution contains the complexing reagent, the final mixing treatment can be conducted by admixing the octenol ether lithium solution and copper$^{(I)}$ halide solution at temperatures in the range of about from $-80°$ to $-20°C$ for about from 5 minutes to 6 hours. Preferably, the treatment is conducted at a temperature of about $-40°C$ for about from 5 minutes to 6 hours. Also, it is preferable to cool the copper salt solution to the mixing temperature range if it is not already within the temperature range.

Where the octenol ether lithium solution contains the complexing reagent (e.g. diamines), the final mixing treatment can be conducted by adding the octenol ether lithium solution to the copper$^{(I)}$ halide solution at temperatures in the range of about from $-100°$ to $-50°C$, preferably about $-78°C$. After the initial admixture, the temperature is increased to about from $-50°$ to $0°C$, preferably about $-20°C$ and maintained at this temperature for about from 5 minutes to 6 hours, preferably about from 20 to 40 minutes. Also, in this case, the copper$^{(I)}$ halide solution should be precooled to about from $-100°$ to $-50°C$, preferably about $-78°C$, (if it is not already within this temperature range) prior to the addition of the octenol ether lithium solution.

Where a tri(alkyl)phosphite or tri(alkyl)phosphine complexing agent is used, it is preferable to admix respective sub-component solutions in relative proportions to provide an ultimate mixture having the following ratio of components (based on initial starting materials) per mole of iodooctenol ether:

1 mole of alkyl lithium;
0.05 to 2 moles of copper halide;
0.1 to 4 moles of trialkyl phosphite or trialkyl phosphine.

Best results are obtained wherein the final mixture, based on initial starting materials, contains about one mole of alkyl lithium; about 0.5 moles of copper$^{(I)}$ halide; and about one mole of trialkyl phosphite or trialkyl phosphine per mole of iodooctenol ether.

Where a tetraalkylalkylenediamine complexing agent is used, the respective solutions should be admixed in relative ratios to provde an ultimate mixture having about the following ratio of components (based on initial starting materials) per mole of iodooctenol ether:

1 mole of alkyl lithium;
0.05 to 2 moles of copper$^{(I)}$ halide;
0.1 to 4 moles of tetraalkylalkylenediamine.

Best results are obtained using about one mole of alkyl lithium; about 0.5 moles of copper halide and about from 0.5 to 1 mole of tetraalkylalkylenediamine per mole of iodooctenol ether.

Where bis-(trimethylphosphite) copper$^{(I)}$ iodide is used, it is preferable that the respective solutions are admixed in relative proportions to provide an ultimate mixture having about the following ratio of components (based on initial starting materials) per mole of iodooctenol ether:

1 mole of alkyl lithium;
0.05 to 2 moles of bis-(trimethylphosphite) copper$^{(I)}$ iodide.

Best results are obtained using about one mole of alkyl lithium and about 0.5 mole of bis-(trimethylphosphite) copper$^{(I)}$ iodide per mole of iodooctenol ether.

The process, according to our invention, for preparing prostaglandins and 11-desoxy derivatives thereof, can be schematically represented by the following overall reaction equation:

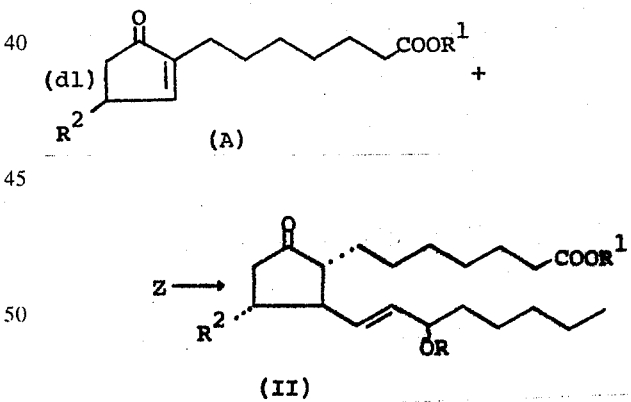

wherein $R^1$ is alkyl having from one through 10 carbon atoms, chloroethyl, dichloroethyl or trichloroethyl; $R^2$ is hydrogen or conventional acid labile ether having from 3 through 10 carbon atoms; and Z is the complexed octenol ether copper$^{(I)}$ lithium reagent, of the invention, and $\sim OR$ corresponds to the ether group of said complexed octenol ether copper$^{(I)}$ lithium reagent and has the same (dl) or (S) configuration.

The process of our invention for preparing prostaglandin esters and ester prostaglandin derivatives can be effected in a single step by treating the 2-(6-carboalkoxy-hexyl)-1-oxo-cyclopent-2-ene starting material of formula A with the composition of formula A, of our invention, under reactive conditions. The process of our invention affords the additional important advantage, that the octenyl 3-ether side chain attaches to the cyclopentane moiety at an opposite configuration to the carboalkoxy-hexyl side chain (i.e. α,β or β,α), thus enhancing isomer selectivity and eliminating the undesired by-product isomers wherein the side chains have the same configuration, i.e. α,α or β,β. Further although the formulas have only been shown as α,β with respect to these side chains, for the sake of convenience, it should be understood that the β,α-configurations are also included. The treatment is typically conducted at temperatures in the range of about from −100° to −30°C for about from 5 minutes to 24 hours. Preferably, the treatment is conducted by adding a solution of the cyclopentene starting material of formul A, in a suitable inert organic solvent, directly to the reagent of our invention. Also, substantially superior results are obtained by using freshly prepared complexed octenol ether copper[(I)] lithium reagents. Suitable inert organic solvents include, for example, diethyl ether, methyl ethyl ether and the like.

Where a racemic 1-iodo-trans-1-octen-3-ol 3-ether has been used in preparing the reagent, of our invention, the product, of formula II, is a mixture of racemic isomer pairs which can be separated into the respective racemic isomer pairs by conventional procedures such as, for example, chromatography. Illustrative non-limiting separation procedures can be had by reference herein below to the appropriate examples. Conversely, where a pure optically active (S)-1-iodo-trans-1-octen-3-ol 3-ether is used, the prostaglandin product will be a mixture of the corresponding 15α-ether prostanoic acid ester and the retro-15-epi ether prostanoic acid ester. Thus, by using an (S)-1-iodo-trans-1-octen-3-ol 3-ether multiple isomerism with respect to the 15-position, as such, will be eliminated. The 15α-and retro-15-epi- isomers can then be separated from each other and recovered as pure optically active isomers, by conventional procedures, typically chromatography.

The respective $R^1$ ester products of formula II can be used directly for their prostaglandin-like properties or can be converted to the corresponding acids via suitable microbiological enzymatic procedures. A preferred nonlimiting enzymatic hydrolysis procedure is, for purposes of illustration, described herein below in Example 14.

The 15-ether group — other than methoxymethoxy and alkoxymethoxy — and also, if present, the 11-ether group can be removed via mild acid hydrolysis according to conventional procedures such as, for example, via treatment with about from 20 to 80% (wt.) aqueous acetic acid at about room temperature for about from 10 to 40 hours. Typically, good results are obtained using about 65% (wt.) aqueous acetic acid for 24 hours.

STARTING MATERIALS

The (dl)-1-iodo-trans-1-octen-3-ol 3-ether, used in the preparation of the reagent of the invention, can be prepared according to the following schematically represented overall reaction sequence:

Step 1 can be conveniently effected by treating 1-chloro-1-octen-3-one (formula A) with an alkali metal iodide (e.g. sodium iodide) in a suitable inert organic solvent. Typically, this treatment is conducted at temperatures in the range of about from 0° to 100°C, and preferably the reflux temperature of this system, for about from ½ to 5 hours and preferably about from 1 to 2 hours. Typically, mole ratios in the range of about from 1 to 10 moles of alkali metal iodide is used per mole of starting material of formula A. Suitable alkali metal iodides which can be used include, for example, sodium iodide and potassium iodide. Suitable inert organic solveents which can be used include, for example, acetone, methyl ethyl ketone, and the like. Typically, best results are obtained using sodium iodide in acetone.

Step 2, reduction of the keto function, can be conveniently effected by treating the compound of formula B with lithium aluminum hydride in a suitable inert organic solvent. Typically, this treatment is conducted at temperatures in the range of about from 0° to 70°C, preferably at about reflux temperature of this system, for about from ½ to 10 hours and preferably about from 1 to 3. Preferably, the treatment is conducted under an inert gaseous atmosphere; e.g., nitrogen. Suitable inert organic solvents which can be used include, for example, diethyl ether, tetrahydrofuran, 1,2-dimethoxyethane, and the like. Also, in place of lithium aluminum hydride, other suitable reducing agents could be used, such as, for example, sodium borohydride; lithium borohydride; zinc borohydride and the like.

The corresponding 3-ethers of formula D can be prepared according to conventional procedures via step 3. For example, by treating the compounds of formula C with the desired ether reagent in a suitable inert organic solvent in the presence of an acid catalyst. Typically, this treatment is conducted at temperatures in the range of about from 0° to 50°C, conveniently at room temperature, for about from ½ to 24 hours. Suitable acid catalysts which can be used include, for example, phosphorous oxychloride, p-toluenesulfonic acid, hydrochloric acid, sulfuric acid, dichloroacetic acid, and the like. Optionally, an inert organic solvent can also be used although typically the ether reagent will also serve as solvent. Suitable ether reagents or alkyl ethers which can be used include, for example, isopropenyl methyl ether, vinyl ether, methylcyclohexenyl ether, dihydropyran, and the like.

Also, where chloro substituted compounds corresponding to the desired protecting group are available, the compounds of formula D can be conveniently prepared by treating 1-iodo-trans-1-octen-3-ol with the corresponding chloro substituted protecting group and sodium hydride, in a suitable inert organic solvent. Thus, for example, chloromethyl methyl will yield the corresponding 3-methoxymethoxy derivative of formula D. Other suitable chloro substituted groups which can be used include, for example, 2-chlorotetrahydro-

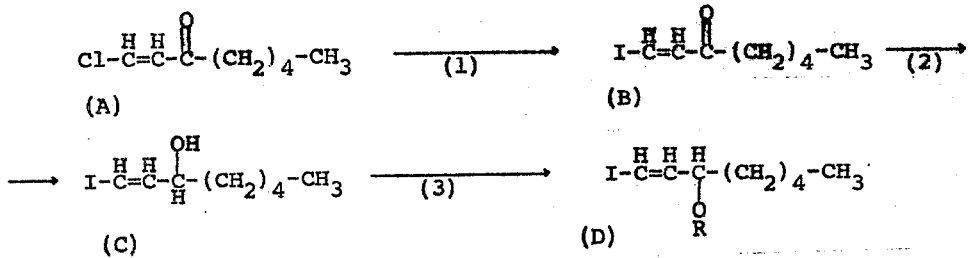

pyran, 2-chlorotetrahydrofuran, and the like. Typically, this treatment is conducted at temperatures in the range of about from 0° to 100°C, preferably about from 20° to reflux for about from ½ to 24 hours, and preferably about from 1 to 3 hours.

The (S)-1-iodo-trans-1-octen-3-ol 3-ethers can be prepared by reduction and iodination of (S)-1-octyn-3-ol (note Fried, et al., Ann. N. Y. Acad. Sci., vol. 180, 38 (1971)) to (S)-1-iodo-trans-1-octen-3-ol. The (S)-1-iodo-trans-1-octen-3-ol compound can then be etherified in the same manner as described above with respect to the (dl) compound. A convenient procedure for reducing and halogenating the octynol compound is described herein below in Example 1A The starting materials of formula A wherein $R^2$ is hydrogen can be conveniently prepared according to the following schematic overall reaction equation sequence:

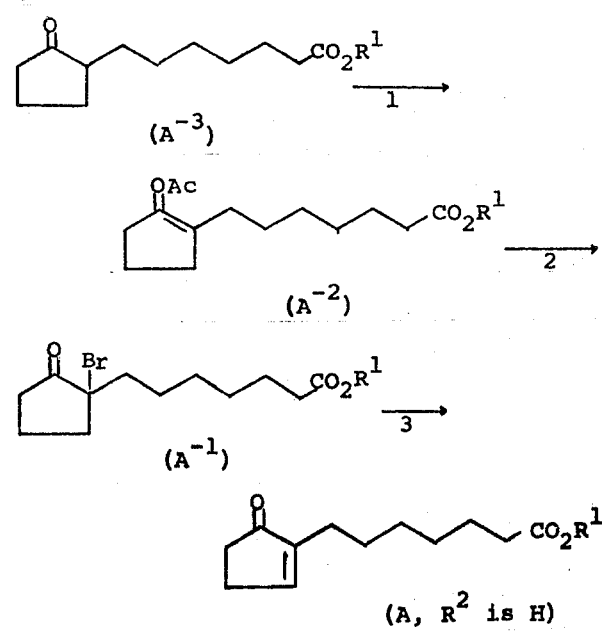

wherein $R^1$ is as defined above; and Ac is a conventional labile acyl, preferably acetyl.

Step 1 of the above preparation can be conveniently effected by treating the compound of formula $A^{-3}$ with isopropenyl acetate in the presence of an acid catalyst. This treatment should be conducted under anhydrous conditions and is typically conducted at the boiling point of isopropenyl acetate until the reaction is complete, usually from 3 to 12 hours. Typically, a large excess of isopropenyl acetate is used. Also in place of isopropenyl acetate, other suitable reagnets can be used, for example, acetic anhydride, propionic anhydride and the like. Suitable acid catalysts which can be used include, for example, mineral acids such as, for example, sulfuric acid and the like and organic acids such as, for example p-toluenesulfonic acid or oxalic acid. The compounds of formula A are known compounds and can be prepared according to know procedures such as, for example, described by Bagli, et al., in *Tetrahedron Letters*, 465-470 (1966).

Step 2 of our preparation is conveniently effected by treating the compounds of formula $A^{-2}$ with N-bromoacetamide or N-bromosuccinimide in a suitable inert organic solvent. Typically, this step is conducted at temperatures in the range of about from −10° to 25°C for about from 5 minutes to 3 hours. Preferably the reaction solution is monitored, for example, by thin-layer chromatography, to ensure that the starting material of formula A is consumed before starting the third step. In step 3, the initial reaction mixture is treated with a suitable base such as, for example, lithium carbonate in pyridine. This phase is typically conducted at temperatures in the range of about from 50° to 100°C for about from 1 to 5 hours.

Alternatively, this treatment can be effected via the use of molecular bromine, in the first phase, in a suitably inert solvent such as, for example, methylene chloride, chloroform, dioxane, carbon tetrachloride and the like. Typically, temperatures in the range of about −10° to 25°C will be used.

The starting materials of formula (A) wherein $R^2$ is a conventional labile ether group can be conveniently prepared according to the following schematic overall reaction sequence:

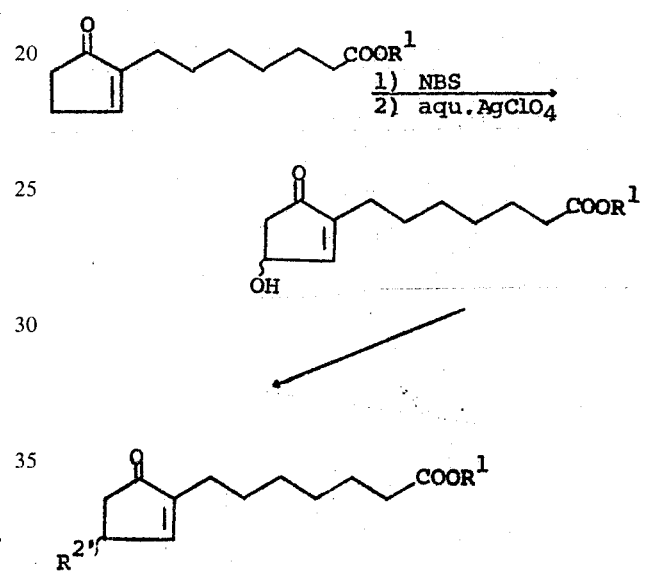

wherein $R^1$ and the wavy lines are as defined herein above; and $R^2$ is an acid labile ether having from 3 through 10 carbon atoms.

The first step of this process is conveniently conducted in two phases and can be conveniently effected by treating the desired 2-(6-carboalkoxy-hexyl)-1-oxo-cyclopent-2-ene with N-bromosuccinimide or equivalent reagent (e.g. N-bromoacetamide, N,N-dibromoacetamide, etc.) in a suitable inert organic solvent (e.g., carbon tetrachloride) followed by irradiation of the mixture with visible wave length light and then treating the product with silver perchlorate in a suitable aqueous inert organic solvent. Considering this treatment as two phases, the first phase is typically conducted at temperatures in the range of about from 0°C to the boiling point of the solvent for about from ½ to 2 hours. Suitable inert organic solvents which can be used include, for example, carbontetrachloride, and the like. Typically, a mole ratio in the range of about from slightly above 1.2 moles of N-bromosuccinimide per mole of cyclopentane derivative starting material is used.

With respect to the irradiation light, any suitable source of visible light can be used, for example, conventional sun lamps.

The second phase of this step can be conveniently effected by treating the brominated product of the first phase with silver perchlorate in a suitable aqueous inert organic solvent. Typically, this phase is conducted at temperatures in the range of about from 0° to 80°C, preferably about from 10° to 35°C for about from ½ to 2 hours. Suitable aqueous inert organic solvents which can be used include, for example, aqueous acetone, aqueous tetrahydrofuran, aqueous dioxane, and the like. Also, preferably the crude brominated product is separated from the first phase reaction mixture prior to conducting the second phase.

The next step, the addition of the ether group, can be effected via any suitable procedure for selectively protecting a hydroxy group, in preference to an oxo group, with the desired ether group. Thus, for example, this can be conveniently obtained by treating the 2-(6-carboalkoxy-hexyl)-4-hydroxy-1-oxo-cyclopent-2-ene product with the desired ether (e.g., isopropenyl methyl ether, dihydropyran, etc.) in the presence of an acid catalyst (e.g. phosphorous oxychloride, p-toluenesulfonic acid, etc.). Typically, this treatment is conducted at temperatures in the range of about from 15° to 30°C, conveniently at room temperature for about from ½ to four hours. Optionally, an inert organic solvent can also be used, though the ether reagent will itself also serve as solvent.

Isolation of the intermediates and products can be effected by any suitable separation or purification procedure such as, for example, extraction, filtration, evaporation, crystallization, and thin-layer chromatography. Specific illustrations of typical separation and isolation procedures can be had by reference to the examples described herein below. However, other equivalent separation or isolation procedures could, of course, also be used.

The prostaglandin products and prostaglandin derivative products of the above processes exhibit prostaglandin-like biological activities and thus are useful in the treatment of mammals where the use of prostaglandins are indicated. The compound (an pharmaceutically acceptable salts) are bronchodilators and thus are useful in treating mammals for bronchial spasm or wherever strong bronchodilators are indicated. The compounds are also useful in controlling or palliating hypertension in mammals and further exhibit central nervous system depressant activity, in mammals, and are useful as sedatives. In addition, the compounds are useful for inducing labor, in pregnancy, and for inducing menses to correct or reduce menstrual abnormalities.

These compounds can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compounds and/or salts, of the invention, and a pharmaceutical carrier. The pharmaceutical carrier can be either a solid material, liquid, or aerosol, in which the compound and/or salt is dissolved, dispersed or suspended, and can optionally contain small amounts of preservatives and/or pH-buffering agents. Suitable preservatives which can be used include, for example, benzyl alchol and the like. Suitable buffering agents include, for example, sodium acetate and pharmaceutical phosphate salts and the like.

The liquid compositions can, for example, be in the form of solutions, emulsions, suspensions, syrups, or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

For inhalation administration, the compounds can, for example, be administered as an aerosol comprising the compounds or salts in an inert propellant together with a cosolvent (e.g., ethanol) together with optional preservatives and buffering agents. Additional general information concerning the inhalation administration of aerosols can be had by reference to U.S. Pat. Nos. 2,868,691 and 3,095,355.

The compounds are typically administered in dosages of about from 0.1 to 10 mg. per kg. of body weight. The precise effective dosage will, of course, vary depending upon the mode of administration, condition being treated, and host.

A further understanding of the invention can be had from the following non-limiting examples. Also, where necessary, examples are repeated to provide starting materials for subsequent examples.

PREPARATION 1

This preparation illustrates methods for preparing 1-acyloxy-2-(6-carboalkoxy-hexyl)-cyclopent-1-ene. In this example, 26.5 g. of 2-(6-carbomethoxy-hexyl)-1-oxocyclopentane is added to 250 ml. of isopropenyl acetate containing 0.4 ml. of concentrated sulfuric acid. The mixture is then slowly distilled for 2 ½ hours and then cooled to room temperature and poured into an iced saturated solution of aqueous sodium bicarbonate. The mixture is then extracted with methylene chloride, and the resulting methylene chloride extract is washed with water and then washed with saturated brine. The washed extract is dried over anhydrous sodium sulfate and then evaporated to dryness affording a crude residue of 1-acetoxy-2-(6-carbomethoxyhexyl)-cyclopent-1-ene, which is then further purified by high vacuum distillation.

Similarly, by following the same procedure as above but respectively using the corresponding ethyl and hexyl ester as starting material, 1-acetoxy-2-(6-carboethoxy-hexyl)-cyclopent-1-ene and 1-acetoxy-2-(6-carbohexoxy-hexyl)-cyclopent-1-ene are respectively prepared.

PREPARATION 2

This preparation illustrates methods of preparing 2-(6-carboalkoxy-hexyl)-1-oxo-cyclopent-2-ene. In this example 20.1 g. of crude 1-acetoxy-2-(6-carbomethoxy-hexyl)-cyclopent-1-ene, prepared according to Preparation-1, is dissolved in 180 ml. of tetrahydrofuran and 20 ml. of water and then cooled to 0°C under nitrogen. Eleven grams of N-bromoacetamide is added. The resulting reaction solution is monitored by thin-layer chromatography and allowed to stand until complete reaction is indicated. The reaction mixture is then poured into water and extracted with methylene chloride. 150 Milliliters of pyridine and 3 g. of lithium carbonate are added to the methylene chloride extracts and the resulting mixture then concentrated by evaporation under reduced pressure to remove most of the methylene chloride. The concentrate is stirred at 90°C under nitrogen, for one hour and then examined by thin-layer chromatography to ensure complete reaction. The reaction solution is then cooled to room temperature and poured into water and extracted with methylene chloride. The methylene chloride extracts are washed with water, saturated aqueous sodium chloride, then dried over sodium sulfate, then evaporated to dryness affording a crude residue of 2-(6-carbomethoxy-hexyl)-1-oxo-cylopent-2-ene, which is then further purified by high vacuum distillation. The product is then dissolved in 350 ml. of methanol, followed by treatment with a solution containing 4.6 g. of semicarbazone hydrochloride and 5 g. of pyridine in 40 ml. of water. The resulting mixture is stirred at room temperature for two hours, then poured into water. The mixture is then filtered, and the collected precipitate washed with hexane. The filtrate and washings are combined and extracted four times with hexane. The combined extract is washed with water, saturated aqueous sodium chloride solution, and then dried over sodium sulfate and evaporated to dryness affording pure 2-(6-carbomethoxy-hexyl)-1-oxo-cyclopent-2-ene.

Similarly, by following the same procedure but respectively using the remaining products of Preparation 1 as starting materials, 2-(6-carboethoxy-hexyl)-1-oxo-cyclopent-2-ene and 2-(6-carbohexoxy-hexyl)-1-oxo-cyclopent-2-ene are respectively prepared.

PREPARATION 3

This preparation illustrates methods of preparing 4-ethers of 2-(6-carboalkoxy-hexyl)-1-oxo-cyclopent-2-ene. In this example a mixture containing 4.23 g. of 2-(6-carbomethoxy-hexyl)-1-oxo-cyclopent-2-ene and 3.36 g. of N-bromosuccinimide in 100 ml. of carbontetrachloride is irradiated with visible light (using a 150 watt Photo-Flood lamp) for 20 minutes at 0°C under nitrogen. The mixture is allowed to cool to room temperature and then filtered and the resulting filtrate evaporated, under vacuum, to dryness. Fifty milliliters of a 1:1, by vol. acetone-water mixture containing 5 g. of silver perchlorate is then added to the residue and the resulting mixture allowed to stand for about 20 minutes at room temperature. The mixture is concentrated by evaporation under reduced pressure to remove most of the acetone and the resulting concentrate extracted four times with 100 ml. portions of ethyl acetate. The ethyl acetate extracts are combined and sequentially washed with 30 ml. of 5% aqueous sodium bicarbonate solution and 30 ml. of saturated aqueous sodium chloride solution. The ethyl acetate solvent is then removed by evaporation, under vacuum, affording a residue which is further purified by silica gel column chromatography eluting with ethyl acetate-hexane mixture, affording pure (dl)-2-(6-carbomethoxy-hexyl)-4-hydroxy-1-oxo-cyclopent-2-ene.

240 Milligrams of 2-(6-carbomethoxy-hexyl)-4-hydroxy-1-oxo-cyclopent-2-ene is dissolved in 5 ml. of benzene containing 200 mg. of isopropenyl methyl ether at room temperature. A small drop of phosphorous oxychloride is then added and the resulting mixture is allowed to stand for two hours at room temperature. A drop of triethylamine is then added and the resulting mixture is poured into water and then extracted with benzene. The benzene extract is sequentially washed with water and saturated aqueous sodium chloride, dried over sodium sulfate and evaporated, under vacuum, to remove excess solvent affording a residue of (dl)-2-(6-carbomethoxy-hexyl)-4-(2'-methoxyprop-2'-oxy)-1-oxocyclopent-2-ene.

Similarly, by following the same procedure but using the corresponding ester-(6-carboalkoxy-hexyl) precursors as starting materials, the following compounds are respectively prepared:

(dl)-2-(6-carboethoxy-hexyl)-4-(2'-methoxyprop-2'-oxy)-1-oxo-cyclopent-2-ene; and (dl)-2-(6-carbohexoxy-hexyl)-4-(2'-methoxyprop-2'-oxy)-1-oxo-cyclopent-2-ene.

Similarly, by following the same procedure as above but respectively replacing isopropenyl methyl ether with isopropenyl ethyl ether, the following compounds are respectively prepared:

(dl)-2-(6-carbomethoxy-hexyl)-4-(2'-ethoxyprop-2'-oxy)-1-oxo-cyclopent-2-ene;

(dl)-2-(6-carboethoxy-hexyl)-4-(2'-ethoxyprop-2'-oxy)-1-oxo-cyclopent-2-ene; and (dl)-2-(6-carbohexoxy-hexyl)-4-(2'-ethoxyprop-2'-oxy)-1-oxo-cyclopent-2-ene.

PREPARATION 3a

This preparation illustrates methods of preparing 4-tetrahydropyranyl ethers 2-(6-carboalkoxy-hexyl)-1-oxo-cyclopent-2-ene. In this preparation, 2.6 g. of 2-(6-carbomethoxy-hexyl)-4-hydroxy-1-oxo-cyclopent-2-ene is dissolved in 50 ml. of benzene containing 2 ml. of dihydropyran at room temperature. A small drop of phosphorous oxychloride is then added and the resulting mixture is stirred for 1 ½ hours. A drop of triethylamine is then added and the resulting mixture is poured into water and then extracted with benzene. The benzene extract is sequentially washed with water and saturated aqueous sodium chloride, dried over anhydrous sodium sulphate and evaporated, under vacuum, to remove excess solvent affording a residue of (dl)-2-(6-carbomethoxy-hexyl)-4-(tetrahydropyranyl-2'-oxy)-1-oxo-cyclopent-2-ene, which is further purified by chromatography on silica gel eluting with graduated mixtures of ethyl acetate and hexane.

Similarly, by following the same procedure but using the corresponding 2-(6-carboalkoxy-hexyl)-1-oxo-cyclopent-2-ene precursors as starting materials, the following compounds are respectively prepared:

(dl)-2-(6-carboethoxy-hexyl)-4-(tetrahydropyranyl-2'oxy)-1-oxo-cyclopent-2-ene; and (dl)-2-(6-carbohexoxy-hexyl)-4-(tetrahydropyranyl-2'-oxy)-1-oxo-cyclopent-2-ene.

EXAMPLE 1

This example illustrates methods of preparing (dl)-1-iodo-trans-1-octene-3-ol. In this example a mixture containing 19 grams of 1-chloro-trans-1-octen-3-one and 25 g. of sodium iodide in 150 ml. of acetone is refluxed for 3 hours. The mixture is then poured into 500 ml. of water and extracted with four 50 ml. portions of diethyl ether. The extracts are combined and then successively washed with 50 ml. of water, 50 ml. of saturated aqueous sodium chloride solution, and then dried over sodium sulfate. The diethyl ether solvent is then removed by evaporation affording a residue of 1-iodo-1-octene-3-one. This residue is then dissolved in 150 ml. of diethyl ether and slowly added over a 30 minute period to a suspension containing 2.5 g. of lithium aluminum hydride in 200 ml. of diethyl ether and the resulting mixture is stirred at room temperature, under nitrogen, for twelve hours. The reaction mixture is then worked up by the sequential dropwise addition of 3 ml. of water, 3 ml. of 15% aqueous sodium hydroxide and 9 ml. of water. The mixture is then filtered and the resulting filtered cake washed with two 50 ml. portions of diethyl ether. The combined filtrate and diethyl ether washings are dried over potassium carbonate, then filtered, and the resulting filtrate evaporated yielding a residue of crude (dl)-1-iodo-trans-1-octene-3-ol.

EXAMPLE 1A

This example illustrates methods of preparing (S)-1-iodo-trans-1-octen-3-ol. In this example 2.38 g. of (S)-3-(tetrahydropyranyl-2'-oxy)-1-octyne, prepared via the acid catalyzed treatment of (S)-1-octyn-3-ol with dihydropyran, is added to 20 ml. of 0.56 M disiamylborane in diglyme, at 0°C under an argon atmosphere, with constant stirring. The mixture is allowed to rise to room temperature and stirred at this temperature for 1 ½ hours. Three grams of trimethylamine oxide is slowly added over a five minute period with cooling (to absorb the heat of reaction) to maintain the temperature at about 50°C. The mixture is then stirred for 30 minutes, at room temperature, and then poured into 100 ml. of 15% (wt.) aqueous sodium hydroxide with stirring. A solution of 8 g. of iodine in 20 ml. of tetrahydrofuran is immediately added and the resulting mixture stirred 30 minutes yielding a two phase liquid-liquid mixture. The aqueous phase is separated and extracted with two 50 ml. portions of diethyl ether. The extracts and the original organic phase are combined and sequentially washed with 50 ml. of 5% aqueous sodium thiosulfate and 50 ml. of saturated aqueous sodium sulfate solution. The washed mixture is then concentrated by evaporation, under vacuum, and the resulting residue chromatographed on silica gel eluting with a 7.5% diethyl ether-hexane mixture yielding pure (S)-1-iodo-3-(tetrahydropyranyl-2'-oxy)-trans-1-octene. The (S)-1-iodo-3-(tetrahydropyranyl-2'-oxy)-trans-1-octene product is then added to 10 ml. of 60% aqueous dichloroacetic acid at room temperature. After one hour, the mixture is poured into 50 ml. of 15% aqueous sodium hydroxide and extracted with three 30 ml. portions of diethyl ether. The extracts are combined, then washed with 50 ml. of saturated aqueous sodium sulfate, and concentrated by vacuum evaporation. The resulting residue is chromatographed on silica gel eluting with diethyl ether-hexane mixtures yielding pure (S)-1-iodo-trans-1-octen-3-ol.

EXAMPLE 2

This example illustrates methods of preparing 3-ethers of (dl)- and (S)-1-iodo-trans-1-octen-3-ol. In this example 5.05 g. of a 56% (wt.) dispersion of sodium hydride in mineral oil is washed with two 100 ml. portions of pentane, followed by decantation to remove excess pentane. 125 Ml. of tetrahydrofuran is then added and the resulting mixture is maintained under nitrogen. A solution containing 25.4 g. of 1-iodo-trans-1-octen-3-ol in 125 ml. of anhydrous tetrahydrofuran is then slowly added over a 30 minute period and the resulting mixture refluxed for an additional 30 minutes. After this time a solution containing 9 g. of chloromethyl methyl ether in 30 ml. of anhydrous tetrahydrofuran is slowly added over a 15 minute period and the resulting mixture refluxed for an additional hour, and then cooled to room temperature and added to 500 ml. of water, followed by extraction with three 100 ml. portions of diethyl ether. The combined diethyl ether fractions are dried over potassium carbonated, filtered, and the resulting filtrate evaporated to dryness affording a crude residue of (dl)-1-iodo-3-methoxymethoxy-trans-1-octene, which is then further purified by chromatography on 1,000 g. of silica gel eluting with 20% ether-hexane mixture.

Similarly, by respectively replacing chloromethyl methyl ether with chloromethyl phenyl ether; 2-chlorotetrahydropyran; and α-chloroethyl ethyl ether, the following compounds are respectively prepared:

(dl)-1-iodo-3-phenoxymethoxy-trans-1-octene;
(dl)-1-iodo-3-(tetrahydropyranyl-2'-oxy)-trans-1-octene; and
(dl)-1-iodo-3-(1'-ethoxyethoxy)-trans-1-octene.

Similarly, by following the same procedure but using (S)-1-iodo-trans-1-octen-3-ol in place of (dl)-1-iodo-trans-1-octen-3-ol, the following optically active compounds are respectively prepared:

(S)-1-iodo-3-methoxymethoxy-trans-1-octene;
(S)-1-iodo-3-phenoxymethoxy-trans-1-octene;
(S)-1-iodo-3-(tetrahydropyranyl-2'-oxy)-trans-1-octene; and
(S)-1-iodo-3-(1'-ethoxyethoxy)-trans-1-octene.

EXAMPLE 3

This example illustrates additional methods of preparing 3-ethers of (dl)- and (S)-1-iodo-trans-1-octen-3-ol. In this example a small drop of phosphorous oxychloride is added to a mixture containing 2.71 g. of (dl)-1-iodo-trans-1-octen-3-ol and 5 g. of isopropenyl methyl ether. The mixture is maintained in a closed reaction vessel for 45 minutes at room temperature and then one drop of triethylamine is added and the resulting mixture evaporated by vacuum evaporation affording a residue of pure (dl)-1-iodo-3-(2'-methoxyprop-2'-oxy)-trans-1-octene.

Similarly, by following the same procedure but respectively using n-butyl isopropenyl ether and pentylcyclohexenyl ether in place of isopropenyl methyl ether, the following compounds are respectively prepared:

(dl)-1-iodo-3-(2'-butoxyprop-2'-oxy)-trans-1-octene; and
(dl)-1-iodo-3-(1'-pent-1''-oxycyclohexyl-1'-oxy)-trans-1-octene.

Similarly, by following the same procedure but replacing (dl)-1-iodo-trans-1-octen-3-ol with (S)-1-iodo-trans-1-octen-3-ol, the following optically active compounds are respectively prepared:

(S)-1-iodo-3-(2'-methoxyprop-2'-oxy)-trans-1-octene;
(S)-1-iodo-3-(2'-butoxyprop-2'-oxy)-trans-1-octene; and
(S)-1-iodo-3-(1'-pent-1''-oxycyclohexyl-1'-oxy)-trans-1-octene.

EXAMPLE 4

This example illustrates methods according to the invention of preparing the compositions of the invention, and methods according to the invention of preparing prostaglandins or prostaglandin derivatives. In this example, 1.71 g. of (dl)-1-iodo-3-methoxymethoxy-trans-1-octene is admixed with 15 ml. of hexane, maintained under argon, with constant stirring and cooled to −78°C. 3.6 Milliliters of a 1.65M solution of n-butyllithium in hexane is then admixed and the resulting mixture stirred for 30 minutes. 0.665 Grams of N,-N,N',N'-tetramethylethylenediamine is added and the resulting mixture stirred at −78°C for an additional 30 minutes. This mixture is then added to a second mixture containing 0.56 g. of copper (I) iodide in 60 ml. of diethyl ether at −78°C under argon. The mixture is then allowed to rise to −20°C and is maintained at this temperature. After 30 minutes a negative Gilman test [note; Gilman and Schulze, *J. Am. Chem. Soc.*, 47, 2002 (1925)] is obtained, indicating the presence of the complexed octenol ether copper (I) lithium reagent. The mixture is then cooled to −78°C and 0.3 g.

of 2-(6'-carbomethoxyhexyl)-1-oxocyclopent-2-ene is added to the solution with stirring. The resulting mixture is allowed to stand for an additional 45 minutes at −78°C. After this time 15 ml. of water is added resulting in a two phase liquid-liquid system. The organic phase is recovered and washed with 50 ml. of aqueous ammonium hydroxide (pH 8) and filtered through diatomaceous earth. The solvent is then removed by evaporation affording a crude product mixture, which is further purified by chromatography on 100 g. of silica gel eluting with 15% ethyl acetate-hexane mixture affording a racemic mixture of the 15α-methoxymethoxy and 15β-methoxymethoxy isomers of 9-oxo-prost-trans-13-enoic acid methyl ester in which the 8-position side chain and 12-position side chain have opposite configurations.

Similarly, by following the same procedures as above, but using the corresponding (dl) products of Example 2 as starting materials, the corresponding (dl)-octenol ether copper⁽¹⁾ lithium reagents are respectively prepared and used to prepare the following compounds (15α and 15β racemic mixtures in which the 8-position and 12-position side chains have opposite configurations):

(dl)-9-oxo-15α-phenoxymethoxyprost-trans-13-enoic acid methyl ester and (dl)-9-oxo-15β-phenoxymethoxy-prost-trans-13-enoic acid methyl ester;

(dl)-9-oxo-15α-(tetrahydropyranyl-2'-oxy)-prost-trans-13-enoic acid methyl ester and (dl)-9-oxo-15β-(tetrahydropyranyl-2'-oxy)-prost-trans-13-enoic acid methyl ester; and (dl)-9-oxo-15α-(1'-ethoxyethoxy)-prost-trans-13-enoic acid methyl ester and (dl)-9-oxo-15β-(1'-ethoxyethoxy)-prost-trans-13-enoic acid methyl ester.

Similarly, by following the same procedure but respectively using the 6'-carboethoxyhexyl and 6'-carbohexoxyhexyl products of Preparation 2 as starting materials, the corresponding ethyl and hexyl esters of the above products are respectively prepared.

EXAMPLE 5

This example illustrates methods according to the invention of preparing the optically active compositions of the invention, and methods according to the invention of preparing prostaglandins or prostaglandin derivatives. In this example, 1.71 g. of (S)-1-iodo-3-methoxymethoxy-trans-1-octene is admixed with 15 ml. of hexane, maintained under argon, with constant stirring and cooled to −78°C. 3.6 Milliliters of a 1.65M solution of n-butyllithium in hexane is then admixed and the resulting mixture stirred for 30 minutes. 0.665 Grams of N,N,N',N'-tetramethylethylenediamine is added and the resulting mixture stirred at −78°C for an additional 30 minutes. This mixture is then added to a second mixture containing 0.56 g. of copper⁽¹⁾ iodide in 60 ml. of diethyl ether at −78°C under argon. The mixture is then allowed to rise to, and is maintained at, −20°C. After 30 minutes a negative Gilman test is obtained indicating the presence of complexed octenol ether copper⁽¹⁾ lithium reagent. The mixture is then cooled to −78°C and 0.3 g. of 2-(6'-carbomethoxyhexyl)-1-oxo-cyclopent-2-ene is added to the mixture with stirring. The resulting mixture is allowed to stand for an additional 45 minutes at −78°C. After this time 15 ml. of water is added resulting in a two phase liquid-liquid system. The organic phase is recovered and washed with 50 ml. of aqueous ammonium hydroxide (pH 8) and filtered through diatomaceous earth. The solvent is then removed by evaporation affording a crude product mixture, which is further purified by chromatography on 100 g. of silica gel eluting with 15% ethyl acetate-hexane mixture affording a mixture of 9-oxo-15α-methoxymethoxy-prost-trans-13-enoic acid methyl ester and retro 9-oxo-15-epi-methoxymethoxy-prost-trans-13-enoic acid methyl ester, in which the 8-position side chain and 12-position side chains have opposite configurations.

Similarly, by following the same procedure as above, but using the corresponding optically active products of Example 2 as starting materials, the corresponding optically active (S)-octenol ether copper⁽¹⁾ lithium reagents are prepared and respectively used to prepare the following compounds (15α and retro-15-epi mixtures in which the 8-position and 12-position side chains have opposite configurations):

9-oxo-15α-phenoxymethoxy-prost-trans-13-enoic acid methyl ester and
retro-9-oxo-15-epi-phenoxymethoxy-prost-trans-13-enoic acid methyl ester;
9-oxo-15α-(tetrahydropyranyl-2'-oxy)-prost-trans-13-enoic acid methyl ester and
retro-9-oxo-15-epi-(tetrahydropyranyl-2'-oxy)-prost-trans-13-enoic acid methyl ester; and
9-oxo-15α-(1'-ethoxyethoxy)-prost-trans-13-enoic acid methyl ester and
retro-9-oxo-15-epi-(tetrahydropyranyl-2'-oxy)-prost-trans-13-enoic acid methyl ester.

Similarly, by following the same procedure but respectively using the 6'-carboethoxyhexyl and 6'-carbohexoxyhexyl products of Preparation 2 as starting materials, the corresponding ethyl esters and hexyl esters of the above products are respectively prepared.

EXAMPLE 6

This example illustrates methods according to the invention of preparing compositions of the invention, and methods according to the invention of preparing prostaglandins or prostaglandin derivatives. In this example, 1.98 g. of (dl)-1-iodo-3-(2'-methoxyprop-2'-oxy)-trans-1-octene is admixed with 15 ml. of hexane, maintained under argon, with constant stirring and cooled to −78°C. 3.6 Milliliters of a 1.65M solution of n-butyllithium in hexane is then admixed and the resulting mixture stirred for 30 minutes. 0.665 Grams of N,N',N'-tetramethylethylenediamine is added and the resulting mixture stirred at −78°C for an additional 30 minutes. This mixtuure is then added to a second mixture containing 0.56 g. of copper⁽¹⁾ iodide in 60 ml. of diethyl ether at 31 78°C under argon. The mixture is then allowed to rise to −20°C and is maintained at this temperature. After 30 minutes a negative Gilman test is obtained, indicating the presence of a complexed octenol ether copper⁽¹⁾ lithium reagent. The mixture is then cooled to −78°C and 0.3 g. of (dl)-2-(6-carbomethoxyhexyl)-4-(2'-methoxyprop-2'-oxy)-1-oxo-cyclopent-2-ene is added to the solution with sirring. The resulting mixture is allowed to stand for an additional 45 minutes at −78°C and then poured into 60 ml. of aqueous pH 7 phosphate buffer resulting in a two phase liquid-liquid system. The organic phase is recovered, filtered through diatomaceous earth and then evaporated affording a product residue of (dl)-11α,15α-bis(2'-methoxyprop-2'-oxy)-9-oxo-prosttrans-13-enoic acid methyl ester and (dl)-11α,15β-bis(2'-methoxyprop-2'-oxy)9-oxo-prost-trans-13-enoic acid methyl ester. The ether groups are then cleaved by treatment with 10 ml. of 65% aqueous acetic acid for 24 hours at room temperature. Fifty milliliters of diethyl ether is added resulting in a two phase liquid-liquid mixture. The organic phase is separated, then washed with aqueous pH 7 phosphate buffer, and then evaporated to dryness. The residue is chromatographed on silica gel yielding (dl)-9-oxo-11α,15α-dihydroxy-prost-trans-13-enoic acid methyl ester and (di)-9-oxo-11α,15β-dihydroxy-prost-trans-13-enoic acid methyl ester as separated products.

Similarly, by following the same procedure but preparing our compositions using (dl)-1-iodo-3-(tetrahydropyranyl-2'-oxy)-trans-1-octene and (dl)-1-iodo-3-(1'-ethoxyethoxy)-trans-1-octene, respectively, the following compounds are respectively prepared as product residues:

(dl)-9-oxo-11α-(2'-methoxyprop-2'-oxy)-15α-(tetrahydropyranyl-2'-oxy)-prost-trans-13-enoic acid methyl ester and (dl)-9-oxo-11α-(2'-methoxyprop-2'-oxy)-15β-(tetrahydropyranyl-2'-oxy)-prost-trans-13-enoic acid methyl ester; and (dl)-9-oxo-11α-(2'-methoxyprop-2'-oxy)-15α-(1'-ethoxyethoxy)-prost-trans-13-enoic acid methyl ester and (dl)-9-oxo-11α-(2'-methoxyprop-2'-oxy)-15β-(1'-ethoxyethoxy)-prost-trans-13-enoic acid methyl ester.

Similarly, by following the same procedure but preparing our reagents using the corresponding (dl) products of Example 3 as starting materials, the following compounds are respectively prepared as product residues:

(dl)-9-oxo-11α-(2'-methoxyprop-2'-oxy)-15α-(2'-butoxyprop-2'-oxyl-prost-trans-13-enoic acid methyl ester and (dl)-9-oxo-11α-(2'-methoxyprop-2'-oxy)-15β-(2'-butoxyprop-2'-oxy)-prost-trans-13-enoic acid methyl ester; and (dl)-9-oxo-11α(2'-methoxyprop-2'-oxy)-15α-(1'-pent-1''-oxy-cyclohexyl-1'-oxy)-prost-trans-13 -enoic acid methyl ester and (dl)-9-oxo-11α-(2'-methoxyprop-2'-oxy)-15β-(1'-pent-1''-oxycyclohexyl-1'-oxy)-prost-trans-13-enoic acid methyl ester.

Similarly, the above product residues are, respectively, directly hydrolyzed to the corresponding dihydroxy products which are then separated by chromatography into the corresponding (dl)-11α,15α-dihydroxy- and (dl)-11α,15β-dihydroxy-compounds.

Similarly, by following the same procedures as above, but respectively using (dl)-2-(6-carboethoxyhexyl)-4-(2'-methoxyprop-2'-oxy)-1-oxo-cyclopent-2-ene and (dl)-2-(6-carbohexoxyhexyl)-4-(2'-methoxyprop-2'-oxy)-1-oxo-cyclopent-2-ene in place of (dl)-2-(6-carbomethoxyhexyl)-4-(2'-methoxyprop-2'-oxy)-1-oxo-cyclopent-2-ene, the corresponding ethyl ester and hexyl ester homologues of the above methyl ester product residues and (dl)-11α,15α-dihydroxy- and (dl)-11α,15β-dihydroxy- compounds are respectively prepared.

EXAMPLE 7

This example illustrates methods according to the invention of preparing compositions of the invention and methods according to the invention of preparing prostaglandins or prostaglandin derivatives. In this example, 1.98 g. of (dl)-1-iodo-3-(2'-methoxyprop-2'-oxy)-trans-1-octene is admixed with 15 ml. of hexane, maintained under argon, with constant stirring and cooled to −78°C. 3.6 Milliliters of a 1.65M solution of n-butyllithium in hexane is then admixed and the resulting mixtuure stirred for 30 minutes. 0.665 Grams of N,-N,N',N'-tetramethylethylenediamine is added and the resulting mixture stirred at −78°C for an additional 30 minutes. This mixture is then added to a second mixture containing 0.56 g. of copper$^{(l)}$ iodide in 60 ml. of diethyl ether at −78°C under argon. The mixture is then allowed to rise to −20°C and is maintained at this temperature. After 30 minutes a negative Gilman test is obtained, indicating the presence of the complexed octenol ether copper$^{(l)}$ lithium reagent. The mixture is then cooled to −78°C and 0.28 g. of 2-(6-carbomethoxyhexyl)-1-oxo-cyclopent-2-ene is added to the solution with stirring. The resulting mixture is allowed to stand for an additional 45 minutes at −78°C and then poured into 60 ml. of aqueous pH 7 phosphate buffer resulting in a two phase liquid-liquid system. The organic phase is recovered, filtered through diatomaceous earth and then evaporated affording a product residue of (dl)-9-oxo-15α-(2'-methoxyprop-2'-oxy)-prost-trans-13 -enoic acid methyl ester and (dl)-9-oxo-15β-(2'-methoxyprop-2'-oxy)-prost-trans-13-enoic acid methyl ester. The ether groups are then cleaved by treatment with 10 ml. of 65% aqueous acetic acid for 24 hours at room temperature. Fifty milliliters of diethyl ether is added resulting in a two phase liquid-liquid mixture. The organic phase is separated, then washed with aqueous pH 7 phosphate buffer, and then evaporated to dryness. The residue is chromatographed on silica gel yielding (dl)-9-oxo-15α-hydroxy-prost-trans-13-enoic acid methyl ester and (d-l)-9-oxo-15β-hydroxy-prost-trans-13-enoic acid methyl ester as separated products.

Similarly, by following the same procedure but in place of (dl)-1-iodo-3-(2'-methoxyprop-2'-oxy)-trans-1-octene respectively using (dl)-1-iodo-3-(tetrahydropyranyl-2'-oxy)-trans-1-octene; (dl)-1-iodo-3-(1'-ethoxyethoxy-trans-1-octene; (dl)-1-iodo-3-(2'-butoxyprop-2'-oxy)-trans-1-octene and (dl)-1-iodo-3-(1'-pent-1''-oxycyclohexyl-1'-oxy)-trans-1-octene, the following compounds are respectively prepared as product residues:

(dl)-9-oxo-15α-(tetrahydropyranyl-2'-oxy)-prost-trans-13-enoic acid methyl ester and (dl)-9-oxo-15β-(tetrahydropyranyl-2'-oxy)-prost-trans-13-enoic acid methyl ester;

(dl)-9-oxo-15α-(1'-ethoxyethoxy)-prost-trans-13 enoic acid methyl ester and (dl)-9-oxo-15β-(1'-ethoxyethoxy)-prost-trans-13-enoic acid methyl ester;

(dl)-9-oxo-15α-(2'-butoxyprop-2'-oxy)-prost-trans-13-enoic acid methyl ester and (dl)-9-oxo-15β-(2'-butoxyprop-2'-oxy)-prost-trans-13-enoic acid methyl ester; and (dl)-9-oxo-15α-(1'-pent-1''-oxycyclohexyl-1-oxy)-prost-trans-13-enoic acid methyl ester and (dl)-9-oxo-15β-(1'-pent-1''-oxycyclohexyl-1'-oxy)-prost-trans-13-enoic acid methyl ester.

Similarly, the above product residues are, respectively, directly hydrolyzed to the corresponding hydroxy products which are then separated by chromatography into the corresponding (dl)-15α-hydroxy- and (dl)-15β-hydroxy- compounds.

Similarly, by following the same procedures as above, but respectively using 2-(6-carboethoxyhexyl)-1-oxo-cyclopent-2-ene and 2-(6-carbohexoxyhexyl)-1-oxo-cyclopent-2-ene, the corresponding ethyl ester and hexyl ester homologues of the above methyl ester product residues and (dl)-15α-hydroxy- and (dl)-15β-hydroxy- compounds are respectively prepared.

EXAMPLE 8

This example illustrates methods according to the invention of preparing the optically active compositions of the invention and methods, according to the invention, of preparing prostaglandins or prostaglandin derivatives. In this example, 1.98 g. of (S)-1-iodo-3-(2'-methoxyprop-2'-oxy)-trans-1-octene is admixed with 15 ml. of hexane, maintained under argon, with constant stirring and cooling to −78°C. 3.6 Milliliters of a 1.65M solution of n-butyllithium in hexane is then admixed and the resulting mixture stirred for 30 minutes.. 0.665 Grams of N,N,N',N'-tetramethylethylenediamine is added and the resulting mixture stirred at −78°C for an additional 30 minutes. This mixture is then added to a second mixture containing 0.56 g. of copper$^{(I)}$ iodide in 60 ml. of diethyl ether at −78°C under argon. The mixture is then allowed to rise to, and is maintained at, −20°C. After 30 minutes a negative Gilman test is obtained indicating the presence of the complexed octenol ether copper$^{(I)}$ lithium reagent. The mixture is then cooled to −78°C and 0.3 g. of (dl)-2-(6'-carbomethoxy-hexyl)-4-(2'-methoxyprop-2'-oxy)-1-oxo-cyclopent-2-ene is added to the mixture with stirring. The resulting mixture is allowed to stand for an additional 45 minutes at −78°C and then poured into 60 ml. of aqueous pH 7 phosphate buffer resulting in a two phase liquid-liquid system. The organic phase is recovered and filtered through diatomaceous earth and then evaporated affording a product residue of 9-oxo-11α-(2'-methoxyprop-2'-oxy)-15α-(2'-methoxyprop-2'-oxy)-prost-trans-13-enoic acid methyl ester and retro-9-oxo-11α-(2'-methoxyprop-2'-oxy)-15-epi-(2'-methoxyprop-2'-oxy)-prost-trans-13-enoic acid methyl ester. The ether groups are then cleaved by treatment withh 10 ml. of 65% aqueous acetic acid for 24 hours at room temperature. Fifty milliliters of diethyl ether is added resulting in a two phase liquid-liquid mixture. The organic phase is separated, washed with aqueous pH 7 phosphate buffer and then evaporated to dryness. The residue is chromatographed on silica gel yielding 9-oxo-11α,15α-dihydroxy-prost-trans-13-enoic acid methyl ester and retro 9oxo-11α,15-epi-dihydroxy-prost-trans-13-enoic acid methyl ester as separated optically active products.

Similarly, by following the same procedure but in place of (S)-1-iodo-3-(2'-methoxyprop-2'-oxy)-trans-1-octene respectively using (S)-1-iodo-3-(tetrahydropyranyl-2'-oxy)-trans-1-octene; (S)-1-iodo-3-(1'-ethoxyethoxy)-trans-1-octene; and (S)-1-iodo-3-(2'-butoxyprop-2'-oxy)-trans-1-octene; and (S)-1-iodo-3-(1'-pent-1''-oxycyclohexyl-1'-oxy)-trans-1-octene, the following compounds are respectively prepared as product residues:

9-oxo-11α(2'-methoxyproop-2'-oxy)-15α-(tetrahydropyranyl-2'-oxy)-post-trans-13-enoic acid methyl ester and
retro-9-oxo-11α-(2'-methoxyprop-2'oxy)-15-epi-(tetrahydropyranyl-2'-oxy)-prost-trans-13-enoic acid methyl ester;
9-oxo-11α-(2'-methoxyprop-2'-oxy)-15α-(1'-ethoxyethoxyl-prost-trans-13-enoic acid methyl ester and
retro-9-oxo-11α(2'-methoxyprop-2'-oxy)-15-epi-(1'-ethoxyethoxy)-prost-trans-13-enoic acid methyl ester;
9-oxo-11α-(2'-methoxyprop-2'-oxy)-15α-(2'-butoxyprop-2-oxy)-prost-trans-13-enoic acid methyl ester and
retro-9-oxo-11α-(2'-methoxyprop-2'-oxy)-15-epi-(2'-butoxyprop-2'-oxy)-prost-trans-13-enoic acid methyl ester; and
9-oxo-11α-(2'-methoxyprop-2'-oxy)-15α-(1'-pentoxycyclohexyl-1''-oxy)-prost-trans-13-enoic acid methyl ester and
retro-9-oxo-11α-(2'-methoxyprop-2'-oxy)-15-epi-(1'-pent-1''-oxycyclohexyl-1'-oxy)-prost-trans-13-enoic acid methyl ester.

Similarly, the above product residues are, respectively, directly hydrolyzed to the corresponding dihydroxy products which are then separated by chromatography into the respective optically active 11α,15α-dihydroxy- and retro-11α,15-epi-dihydroxy compounds.

Similarly, by following the same procedures as above, but respectively using (dl)-2-(6-carboethoxyhexyl)-4-(2'-methoxyprop-2'-oxy)-1-oxo-cyclopent-2-ene and (dl)-2-(6-carbohexoxyhexyl)-4-(2'-methoxyprop-2'-oxy)-1-oxo-cyclopent-2-ene in place of (dl)-2-(6-carbomethoxyhexyl)-4-(2'-methoxyprop-2'-oxy)-1-oxo-cyclopent-2-ene, the corresponding ethyl ester and hexyl ester homologues of the above methyl ester product residues and optically active 11α,15α-dihydroxy- and retro-11α,15-epi-dihydroxy-compounds are respectively prepared.

EXAMPLE 9

This example illustrates methods according to the invention of preparing optically active compositions, of the invention, and methods, according to the invention of preparing prostaglandins or prostaglandin derivatives. In this example, 1.98 g. of (S)-1-iodo-3-(2'-methoxyprop-2'-oxy)-trans-1-octene is admixed with 15 ml. of hexane, maintained under argon, with constant stirring and cooled to −78°C. 3.6 Milliliters of a 1.65M solution of n-butyllithium in hexane is then admixed and the resulting mixture stirred for 30 minutes. 0.665 Grams of N,N,N',N'-tetramethylethylenediamine is added and the resulting mixture stirred at −78°C for an additional 30 minutes. This mixture is then added to a second mixture containing 0.56 g. of copper$^{(I)}$ iodide in 60 ml. of diethyl ether at −78°C under argon. The mixture is then allowed to rise to, and is maintained at, −20°C. After 30 minutes a negative Gilman test is obtained indicating the presence of complexed octenol ether copper$^{(I)}$ lithium reagent. The mixture is then cooled to −78°C and 0.28 g. of 2-(6-carbomethoxyhexyl)-1-oxo-cyclopent-2-ene is added to the mixture with stirring. The resulting mixture is allowed to stand for an additional 45 minutes at −78°C and then poured into 60 ml. of aqueous pH 7 phosphate buffer resulting in a two phase liquid-liquid system. The organic phase is recovered and filtered through diatomaceous earth and then evaporated affording a product residue of 9-oxo-15α-(2′-methoxyprop-2′-oxy)-prost-trans-13-enoic acid methyl ester and retro-9-oxo-15-epi-(2′-methoxyprop-2′-oxy)-prost-trans-13-enoic acid methyl ester. The ether groups are then cleaved by treatment with 10 ml. of 65% aqueous acetic acid for 24 hours at room temperature. Fifty milliliters of diethyl ether is added resulting in a two phase liquid-liquid mixture. The organic phase is separated, washed with aqueous pH 7 phosphate buffer and then evaporated to dryness. The residue is chromatographed on silica gel yielding 9-oxo-15α-hydroxy-prost-trans-13-enoic acid methyl ester and retro-9-oxo-15-epi-hydroxy-prost-trans-13-enoic acid methyl ester.

Similarly, by following the same procedure but in place of (S)-1-iodo-3-(2′-methoxyprop-2′-oxy)-trans-1-octene respectively using (S)-1-iodo-3-tetrahydropyranyl-2′-oxy)-trans-1-octene; (S)-1-iodo-3-(1′-ethoxyethoxy)-trans-1-octene; (S)-1-iodo-3-(2′-butoxyprop-2′-oxy)-trans-1-octene; and (S)-1-iodo-3-(1′-pent-1″-oxycyclohexyl-1′-oxy)-trans-1-octene, the following compounds are respectively prepared as product residues:

9-oxo-15α-(tetrahydropyranyl-2′-oxy)-prost-trans-13-enoic acid methyl ester and
retro-9-oxo-15-epi-(tetrahydropyranyl-2′-oxy)-prost-trans-13-enoic acid methyl ester;
9-oxo-15α-(1′-ethoxyethoxy)-prost-trans-13-enoic acid methyl ester and
retro-9-oxo-15-epi-(1′-ethoxyethoxy)-prost-trans-13-enoic acid methyl ester;
9-oxo-15α-(2′-butoxyprop-2′-oxy)-prost-trans-13-enoic acid methyl ester and
retro-9-oxo-15-epi-(2′-butoxyprop-2′-oxy)-prost-trans-13-enoic acid methyl ester; and
9-oxo-15α-(1′-pent-1″-oxycyclohexyl-1′-oxy)-prost-trans-13-enoic acid methyl ester and
retro-9-oxo-15-epi-(1′-pent-1″-oxycyclohexyl-1′-oxy)-prost-trans-13-enoic acid methyl ester.

Similarly, the above product residues are, respectively, directly hydrolyzed to the corresponding hydroxy products which are then separated by chromatography into the respective optically active 15α-hydroxy- and retro-15-epi-hydroxy-compounds.

Similarly, by following the same procedures as above, but respectively using 2-(6-carboethoxyhexyl)-1-oxo-cyclopent-2-ene and 2-(6-carbohexoxyhexyl)-1-oxo-cyclopent-2-ene (dl)-2-(6-carbomethoxyhexyl)-1-oxo-cyclopent-2-ene, the corresponding ethyl ester and hexyl ester homologues of the above methyl ester product residues and optically active 15α-hydroxy- and retro-15-epi-hydroxy- compounds are respectively prepared.

EXAMPLE 10

This example illustrates further methods according to the invention of preparing compositions of the invention and methods according to the invention of preparing prostaglandin derivatives. In this example, 3.39 g. of (dl)-1-iodo-3-(2′-methoxyprop-2′-oxy)-trans-1-octene is admixed with 10 ml. of hexane under an argon atmosphere. The resulting mixture is maintained under argon and cooled to −78°C and 6.5 ml. of a 1.65M n-butyllithium in hexane solution is added. The resulting mixture is continuously stirred and maintained at −78°C for 30 minutes. The mixture is then added to a mixture containing 2.28 g. of bis-(trimethylphosphite) copper[(I)] iodide in 60 ml. of ether, at −78°C, under argon. The resulting mixture is maintained at −40°C until a negative Gilman test is obtained (about 15 minutes), indicating the presence of the complexed octenol ether copper[(I)] lithium reagent, and is then cooled to −78°C. A solution containing 0.24 g. of 2-(6-carbomethoxy-hexyl)-1-oxo-cyclopent-2-ene in 1 ml. of anhydrous ethyl ether is then added and the resulting mixture stirred at −78°C for 15 minutes, then heated to −40°C and quenched with 10 ml. of water resulting in a formation of a two phase liquid-liquid system. The organic phase is separated and concentrated by evaporation. The concentrate is dissolved in 30 ml. of dimethyl sulfoxide and the resulting solution extracted with four 20 ml. portions of hexane. The extracts are combined and evaporated affording, as a residue, a crude mixture of (dl)-9-oxo-15α-(2′-methoxyprop-2′-oxy)-prost-trans-13-enoic acid methyl ester and (dl)-9-oxo-15β-(2′-methoxyprop-2′-oxy)-prost-trans-13-enoic acid methyl ester. The crude residue is then mixed with 40 ml. of methanol, 5 ml. of water, and one drop of concentrated hydrochloric acid. The resulting mixture is allowed to stand for 45 minutes at room temperature, after which time an excess of methanolic ammonia is added and the resulting mixture concentrated by vacuum evaporation. The concentrate is triturated with 40 ml. of diethyl ether and the resulting extract is washed with 10 ml. of 10% aqueous ammonium hydroxide and 10 ml. of aqueous saturated sodium chloride solution, and then evaporated to dryness affording a crude mixture of the (dl)15α-hydroxy and 15β-hydroxy isomers of 9-oxo-prost-trans-13-enoic acid methyl ester (in which the 8-position and 12-position side chains have opposite configuration) which is then separated into the respective (dl)-15α-hydroxy- and (dl)-15β-hydroxy- compounds by preparative thin-layer chromatography.

Similarly, by following the same procedure as above but using the other products of Example 3 as starting materials, the corresponding complexed octenol ether copper[(I)] lithium reagents are respectively prepared and respectively used to prepare the following compounds as product residues:

(dl)-9-oxo-15α-(2′-butoxyprop-2′-oxy)-prost-trans-13-enoic acid methyl ester and
(dl)-9-oxo-15β-(2′-butoxyprop-2′-oxy)-prost-trans-13-enoic acid methyl ester;
(dl)-9-oxo-15α-(1′-pent-1″-oxycyclohexyl-1′-oxy)-prost-trans-13-enoic acid methyl ester and
(dl)-9-oxo-15β-(1′-pent-1″-oxycyclohexyl-1′-oxy)-prost-trans-13-enoic acid methyl ester.

Similarly, the above product residues are, respectively, directly hydrolyzed to the corresponding hydroxy products which are then separated by chromatography into the corresponding (dl)-15α-hydroxy- and (dl)-15β-hydroxy- compounds.

Similarly, by following the same procedures as above, but respectively using 2-(6-carboethoxyhexyl)-1-oxo-cyclopent-2-ene and 2-(6-carbohexoxyhexyl)-1-oxo-cyclopent-2-ene in place of 2-(6-carbomethoxyhexyl)-

1-oxo-cyclopent-2-ene, the corresponding ethyl ester and hexyl ester homologues of the above methyl ester product residues and (dl)-15α-hydroxy- and (dl)-15β-hydroxy- compounds are respectively prepared.

EXAMPLE 11

This example illustrates further methods according to the invention of preparing optically active compositions of the invention and methods according to the invention of preparing prostaglandin derivatives. In this example, 3.39 g. of (S)-1-iodo-3-(2'-methoxyprop-2'-oxy)-trans-1-octene is admixed with 10 ml. of hexane under an argon atmosphere. The resulting mixture is maintained under argon and cooled to −78°C and 6.5 ml. of a 1.65M n-butyllithium in hexane solution added. The resulting mixture is continuously stirred and maintained at −78°C for 30 minutes. The mixture is then added to a mixture containing 2.28 g. of bis-(trimethylphosphite) copper[(I)] iodide in 60 ml. of ether, at −78°C under argon. The resulting mixture is maintained at −40°C until a negative Gilman test is obtained (about 15 minutes), indicating the presence of the complexed octenol ether copper[(I)] lithium reagent, and is then cooled to −78°C. A solution containing 0.24 g. of 2-(6'-carbomethoxy-hexyl)-1-oxo-cyclopent-2-ene in 1 ml. of anhydrous ethyl ether is then added and the resulting mixture stirred at −78°C for 15 minutes, then heated to −40°C and quenched with 10 ml. of water resulting in a formation of a two phase liquid-liquid system. The organic phase is separated and concentrated by evaporation. The concentrate is dissolved in 30 ml. of dimethyl sulfoxide and the resulting solution extracted with four 20 ml. portions of hexane. The extracts are combined and evaporated affording, as a residue, a crude mixture of 9-oxo-15α-(2'-methoxyprop-2'-oxy)-prost-trans-13-enoic acid methyl ester and retro-9-oxo-15-epi-(2'-methoxyprop-2'-oxy)-prost-trans-13-enoic acid methyl ester. The crude residue is then mixed with 40 ml. of methanol, 5 ml. of water, and one drop of concentrated hydrochloric acid. The resulting mixture is allowed to stand for 45 minutes at room temperature, after which time an excess of methanolic ammonia is added and the resulting mixture concentrated by vacuum evaporation. The concentrate is triturated with 40 ml. of diethyl ether and the resulting extract is washed with 10 ml. of 10% aqueous ammonium hydroxide and 10 ml. of aqueous saturated sodium chloride solution, and then evaporated to dryness affording a crude mixture of 9-oxo-15α-hydroxy-prost-trans-13-enoic acid methyl ester and retro-9-oxo-15-epi-hydroxy-prost-trans-13-enoic acid methyl ester, which is then separated into the respective optically active 15α-hydroxy- and retro-15-epi- isomers by preparative thin-layer chromatography.

Similarly, by following the same procedure as above but in place of (S)-1-iodo-3-(2'-methoxyprop-2'-oxy)-trans-1-octene, respectively using (S)-1-iodo-3-(2'-butoxyprop-2'-oxy)-1-octene and (S)-1-iodo-3-(1'-pent-1''-oxycyclohexyl-1'-oxy)-trans-1-octene, the following compounds are prepared as product residues:

9-oxo-15α-(2'-butoxyprop-2'-oxy)-prost-trans-13-enoic acid methyl ester and retro-9-oxo-15-epi-(2'-butoxyprop-2'-oxy)-prost-trans-13-enoic acid methyl ester; and 9-oxo-15α-(1'-pent-1''-oxycyclohexyl-1'-oxy)-prost-trans-13-enoic acid methyl ester and retro-9-oxo-15-epi-(1'-pent-1''-oxycyclohexyl-1'-oxy)-prost-trans-13-enoic acid methyl ester.

Similarly, the above product residues are, respectively, directly hydrolyzed to the corresponding hydroxy products which are then separated by chromatography into the respective optically active 15α-hydroxy- and retro-15-epi-hydroxy compounds.

Similarly, by following the same procedures as above, but respectively using 2-(6-carboethoxyhexyl)-1-oxo-cyclopent-2-ene and 2-(6-carbohexoxyhexyl)-1-oxo-cyclopent-2-ene in place of 2-(6-carbomethoxyhexyl)-1-oxo-cyclopent-2-ene, the corresponding ethyl ester and hexyl ester homologues of the above methyl ester product residues and optically active 15α-hydroxy- and retro-15-epi-hydroxy- compounds are respectively prepared.

EXAMPLE 12

This example illustrates further methods according to the invention of preparing compositions, of the invention, and methods according to the invention of preparing prostaglandin derivatives. In this example, 3.39 g. of (dl)-1-iodo-3-(2'-methoxyprop-2'-oxy)-trans-1-octene is admixed with 10 ml. of hexane under an argon atmosphere. The resulting mixture is maintained under argon and cooled to −78°C and 6.5 ml. of a 1.65M n-butyllithium in hexane solution is added. The resulting mixture is continuously stirred and maintained at −78°C for 30 minutes. The mixture is then added to a mixture containing 2.28 g. of bis-(trimethylphosphite) copper[(I)] iodide in 60 ml. of ether, at −78°C, under argon. The resulting mixture is maintained at −40°C until a negative Gilman test is obtained (about 15 minutes), indicating the presence of the complexed octenol ether copper[(I)] lithium reagent, and is then cooled to −78°C. A solution containing 0.35 g. of (dl)-2-(6-carbomethoxy-hexyl)-4-(tetrahydropyranyl-2-oxy)-1-oxo-cyclopent-2-ene in 1 ml. of anhydrous ethyl ether is then added and the resulting mixture stirred at −78°C for 15 minutes, then heated to −40°C and quenched with 10 ml. of water resulting in a formation of a two phase liquid-liquid system. The organic phase is separated and concentrated by evaporation. The concentrate is dissolved in 30 ml. of dimethyl sulfoxide and the resulting solution extracted with four 20 ml. portions of hexane. The extracts are combined and evaporated affording, as a residue, a crude mixture of the (dl)-15α-(2'-methoxyprop-2'-oxy)- and (dl)-15β-(2'-methoxyprop-2'-oxy)- isomers of 11α-(tetrahydropyranyl-2'-oxy)-9-oxoprost-trans-13-enoic acid methyl ester. The ether groups are then cleaved by treatment with 10 ml. of 65% aqueous acetic acid for 24 hours at room temperature. Fifty milliliters of diethyl ether is added resulting in a two phase liquid-liquid mixture. The organic phase is separated, washed with aqueous pH 7 phosphate buffer and then evaporated to dryness. The residue is chromatographed on silica gel yielding as separate products (dl)-9-oxo-11α,15α-dihydroxy-prost-trans-13-enoic acid methyl ester and (dl)-9-oxo-11α,15β-dihydroxy-prost-trans-13-enoic acid methyl ester.

Similarly, by following the same procedure as above but preparing the composition, of the invention, by using the corresponding (dl)-iodooctenol ethers prepared in Example 3, the following compounds are respectively prepared as product residues:

(dl)-9-oxo-11α-(tetrahydropyranyl-2'-oxy)-15α-(2'-methoxyprop-2'-oxy)-prost-trans-13-enoic acid methyl ester and (dl)-9-oxo-11α-(tetrahydropyranyl-2'-oxy)-15β-(2'-methoxyprop-2'-oxy)-prost-trans-13-enoic acid methyl ester;

(dl)-9-oxo-11α-(tetrahydropyranyl-2'-oxy)-15α-(2'-butoxyprop-2'-oxy)-prost-trans-13-enoic acid methyl ester and (dl)-9-oxo-11α-(tetrahydropyranyl-2'-oxy)-15β-(2'-butoxyprop-2'-oxy)-prost-trans-13-enoic acid methyl ester; and (dl)-9-oxo-11α-(tetrahydropyranyl-2'-oxy)-15α-(1'-pent-1''-oxycyclohexyl-1''-oxy)-prost-trans-13-enoic acid methyl ester and (dl)-9-oxo-11α-(tetrahydropyranyl-2'-oxy)-15β-(1'-pent-1''-oxycyclohexyl-1'-oxy)-prost-trans-13-enoic acid methyl ester.

Similarly, the above product residues are, respectively, directly hydrolyzed to the corresponding dihydroxy products which are then separated by chromatography into the corresponding (dl)-11α,15α-dihydroxy- and (dl)-11α,15β-dihydroxy-compounds.

Similarly, by following the same procedures as above, but respectively using (dl)-2-(6-carboethoxyhexyl)-4-(tetrahydropyranyl-2'-oxy)-1-oxo-cyclopent-2-ene and (dl)-2-(6-carbohexoxyhexyl)-4-(tetrahydropyranyl-2'-oxy)-1-oxo-cyclopent-2-ene in place of (dl)-2-(6-carbomethoxyhexyl)-4-(tetrahydropyranyl-2'-oxy)-1-oxo-cyclopent-2-ene, the corresponding ethyl ester and hexyl ester homologues of the above methyl ester product residues and (dl)-11α,15α-dihydroxy- and (dl)-11α,15β-dihydroxy- compounds are respectively prepared.

EXAMPLE 13

This example illustrates methods according to the invention of preparing additional optically active compositions of the invention and also methods according to the invention of preparing other prostaglandins. In this example 3.39 g. of (S)-1-iodo-3-(2'-methoxyprop-2'-oxy)-trans-1-octene is admixed with 10 ml. of hexane under an argon atmosphere. The resulting mixture is maintained under argon and cooled to −78°C and 6.5 ml. of a 1.65M n-butyllithium in hexane solution added. The resulting mixture is continuously stirred and maintained at −78°C for 30 minutes. The mixture is then added to a mixture containing 2.28 g. of bis-(trimethylphosphite) copper⁽¹⁾ iodide in 60 ml. of ether, at −78°C, under argon. The resulting mixture is maintained at −40°C until a negative Gilman test is obtained (about 15 minutes), indicating the presence of the complexed octenol ether copper⁽¹⁾ lithium reagent, and is then cooled to −78°C. A solution containing 0.35 g. of (dl)-2-(6'-carbomethoxy-hexyl)-4-(tetrahydropyranyl-2'-oxy)-1-oxo-cyclopent-2-ene in 1 ml. of anhydrous ethyl ether is then added and the resulting mixture stirred at −78°C for 15 minutes, then heated to −40°C and quenched with 10 ml. of water resulting in a formation of a two phase liquid-liquid system. The organic phase is separated and concentrated by evaporation. The concentrate is dissolved in 30 ml. of dimethyl sulfoxide and the resulting solution extracted with four 20 ml. portions of hexane. The extracts are combined and evaporated affording, as a residue, 15α-(2'-methoxyprop-2'-oxy)-11α-(tetrahydropyranyl-2'-oxy)-9-oxo-prost-trans-13-enoic acid methyl ester and retro-15-epi-(2'-methoxy-2'-oxy)-11α-(tetrahydropyranyl-2'-oxy)-9-oxo-prost-trans-13-enoic acid methyl ester. The ether groups are then cleaved by treatment with 10 ml. of 65 % aqueous acid for 24 hours at room temperature. Twenty milliliters of diethyl ether is added resulting in a two phase liquid-liquid mixture. The organic phase is separated, washed with aqueous pH 7 phosphate buffer and then evaporated to dryness. The residue is chromatographed on silica gel yielding 11α,15α-dihydroxy-9-oxoprost-trans-13-enoic acid methyl ester and retro-11α,15-epidihydroxy-9-oxoprost-trans-13-enoic acid methyl ester as separate optically active isomers.

Similarly, by following the same procedure as above but preparing the composition of the invention by using the corresponding optically active (S)-iodooctenol ethers of Example 3, the following compounds are respectively prepared as product residues:

9-oxo-11α-(tetrahydropyranyl-2'-oxy)-15α-(2'-methoxyprop-2'-oxy)-prost-trans-13-enoic acid methyl ester and reto-9-oxo-11α-(tetrahydropyranyl-2'-oxy)-15-epi-(2'-methoxyprop-2'-oxy)-prost-trans-13-enoic acid methyl ester;

9-oxo-11α-(tetrahydropyranyl-2'-oxy)-15α-(2'-butoxyprop-2'-oxy)-prost-trans-13-enoic acid methyl ester and retro-9-oxo-11α-(tetrahydropyranyl-2'-oxy)-15-epi-(2'-butoxyprop-2'-oxy)-prost-trans-13-enoic acid methyl ester;

9-oxo-11α-(tetrahydropyranyl-2'-oxy)-15α-(1'-pent-1''-oxyprop-1'-oxy)-prost-trans-13-enoic acid methyl ester; and retro-9-oxo-11α-(tetrahydropyranyl-2'-oxy)-15-epi-(1'-pent-1''-oxyprop-1'-oxy)-prost-trans-13-enoic acid methyl ester.

Similarly, the above product residues are, respectively, directly hydrolyzed to the corresponding dihydroxy products which are then separated by chromatography into the respective optically active 11α,15α-dihydroxy- and retro-11α, 15-epidihydroxy compounds are respectively prepared.

Similarly, by following the same procedures as above, but respectively using 2-(6-carboethoxyhexyl)-4-(tetrahydropyranyl-2'-oxy)-1-oxo-cyclopent-2-ene and 2-(6-carbohexoxyhexyl)-4-(tetrahydropyranyl-2'-oxy)-1-oxo-cyclopent-2-ene in place of 2-(6-carbomethoxyhexyl)-4-(tetrahydropyranyl-2'-oxy)-1-oxo-cyclopent-2-ene, the corresponding ethyl ester and hexyl ester homologues of the above methyl ester product residues and optically active 11α,15α-dihydroxy and retro-11α,15-epidihydroxy compounds are respectively prepared.

Similarly, by following the same procedure but respectively using (dl)-2-(6-carbomethoxyhexyl)-4-(2'-methoxyprop-2'-oxy)-1-oxo-cyclopent-2-ene; (dl)-2-(6-carboethoxyhexyl)-4-(2'-methoxyprop-2'-oxy)-1-oxo-cyclopent-2-ene; and (dl)-2-(6-carbohexoxyhexyl)-4-(2'-methoxyprop-2'-oxy)-1-oxocyclopent-2-ene as the starting materials, the corresponding 11α,15α-bis(2'-methoxyprop-2'-oxy)- and retro-11α,15-epi-bis(2'-methoxyprop-2'-oxy) analogs are respectively prepared as product residue mixtures and then hydrolyzed and separated into the respective optically active 11α,15α-dihydroxy- and retro-11α,15-epi-dihydroxy- compounds.

EXAMPLE 14

This example illustrates microbiological methods for removing the acid ester group. In this example an enzyme preparation is prepared by suspending 10 g. of crude pancreatic lipase (note; Biochem. Biophysics Acta., v. 23, page 264 (1957)) in 65 ml. of water at 0°C. The suspension is stirred for one hour at 0°C and then centrifuged for twenty minutes at 10,000 xg. The supernatant liquid is separated and maintained at 0°C for later use. The precipitate is again suspended in 65 ml. of water at 0°C and centrifuged as before. The supernatant liquid is separated and combined with the previously obtained supernatant liquid and then added to 130 ml. of saturated aqueous ammonium sulfate solution at 0°C, with stirring, and then allowed to stand for five minutes. The resulting mixture is then centrifuged at 10,000 xg. for 20 minutes. The supernatant liquid is decanted and the precipitate is collected, then dissolved in sufficient water to yield 125 ml. of solution. Fifteen milliliters of saturated aqueous ammonium sulfate solution is then added to the water solution yielding a suspension which is then centrifuged at 10,000 xg. for twenty minutes. The supernatant liquid is collected and treated with 100 ml. of saturated ammonium sulfate affording a second suspension, which is divided into two equal portions. Each portion is again centrifuged for twenty minutes at 10,000 xg., and in each instance the supernatant liquid is discarded (decantation) and the precipitate collected. Each precipitate is stored at 40°C, prior to use. Immediately prior to use, as described herein below, the precipitate is dissolved in 25 ml. of an aqueous 0.1 mole sodium chloride and 0.05M calcium chloride solution and then titrated to pH 7.2 by the careful addition of 0.1M aqueous sodium hydroxide solution. Four milliliters of this solution is admixed with 6 mg. of 11α,15α-dihydroxy-9-oxo-prost-13-enoic acid methyl ester (PGE$_1$-methyl ester) at room temperature in a reaction vessel. The resulting mixture is immediately emulsified by sonication for one minute. The sides of the reaction vessel are then washed down by the addition of an additional 1 ml. of enzyme solution. The pH of the solution is adjusted to, and controlled at, pH 7 by the addition of 0.1M aqueous sodium hydroxide using an automatic pH control devise, for one hour.

The mixture is then extracted with three 5 ml. portions of diethyl ether. The remaining aqueous layer is acidified to pH 4 by the slow addition of acetic acid and then again extracted with three additional 5 ml. portions of diethyl ether. The six diethyl ether extracts are combined, dried over sodium sulfate for 12 hours and then evaporated affording an oily residue. The residue is dissolved in methanol, purified by thin-layer chromatography on silica gel yielding pure 11α,15α-dihydroxy-9-oxoprost-trans-13-enoic acid (PGE$_1$).

Similarly, by following the same procedure as above but respectively using the 15-hydroxy and 11,15-dihydroxy prostanoic acid ester products of Examples 4 through 12 as starting materials, the corresponding prostaglandin acids are respectively prepared.

Obviously many modifications of the invention, described herein above and below, can be made without departing from the essence and scope thereof.

What is claimed is:

1. A process for preparing prostaglandins and prostaglandin derivatives which comprises treating a compound having the formula:

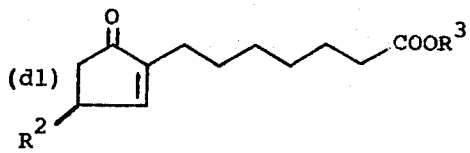

wherein R$^2$ is hydrogen or acid labile ether having from 3 through 10 carbon atoms; and R$^3$ is lower alkyl, chloroethyl, dichloroethyl, or trichloroethyl; with a complexed octen-3-ol 3-acid labile ether copper$^{(I)}$ lithium reagent, in a mixed inert organic solvent at temperatures in the range of about from −100° to −30°C for about from five minutes to 24 hours, thereby yielding the corresponding mixture of products having the formula:

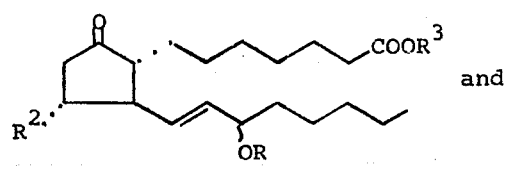

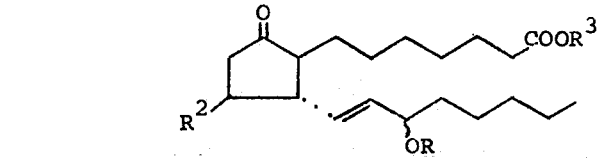

wherein R$^2$ and R$^3$ are as defined herein above; and ~OR is an acid labile ether corresponding to, and having the same (dl) or (S) configuration as that present in said complexed octen-3-ol 3-ether copper$^{(I)}$ lithium reagent.

2. The process of claim 1 wherein said treatment is conducted at a temperature of about −78°C for about from 20 minutes to 4 hours.

3. A process for preparing prostaglandins and prostaglandin derivatives which comprises treating a compound having the formula

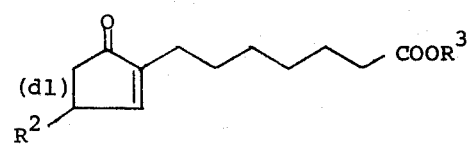

wherein R$^2$ is hydrogen or acid labile ether having from 3 through 10 carbon atoms; and R$^3$ is lower alkyl, chloroethyl, dichloroethyl, or trichloroethyl; with a freshly prepared complexed octenol ether copper$^{(I)}$ lithium reagent composition consisting essentially of a (dl) or optically active (S) isomer mixture of compounds having the formulas:

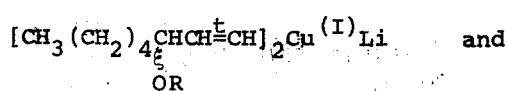

and

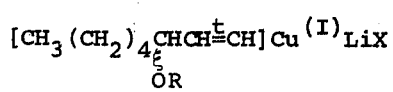

wherein ~OR is an acid labile ether; X is a halide; the t over the double bond indicates the trans configuration; and the wavy line indicates either a (dl) mixture with respect to this asymmetric center or the optically active (S) isomer; complexed by an electron-rich neutral complexing reagent, which coordinates with transition metals, in an inert organic solvent mixture at temperatures in the range of about from −100° to −30°C for about from five minutes to 24 hours, thereby yielding the corresponding mixture of products having the formulas:

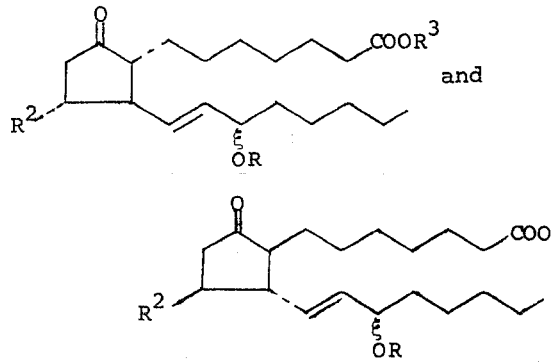

wherein R², R³ and ~ OR are as defined above.

4. A process for preparing prostaglandins and prostaglandin derivatives which comprises treating a compound having the formula:

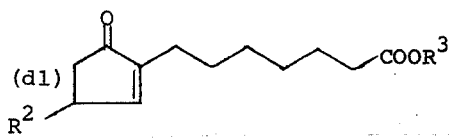

wherein R² is hydrogen or acid labile ether having from 3 through 10 carbon atoms; and R³ is lower alkyl, chloroethyl, dichloroethyl, or trichloroethyl; with a freshly prepared complexed octenol ether copper (I) lithium reagent composition consisting essentially of an optically active (S) isomer mixture of compounds having the formulas:

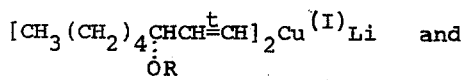

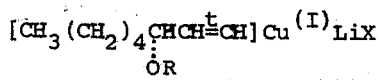

wherein ...OR is an acid labile ether; X is a halide; and the t over the double bond indicates the trans configuration; complexed by an electron-rich neutral complexing reagent, which coordinates with transition metals, in an inert organic solvent mixture, at temperatures in the range of about from −100° to −30°C for about from five minutes to 24 hours, thereby yielding the corresponding mixture of products having the formulas:

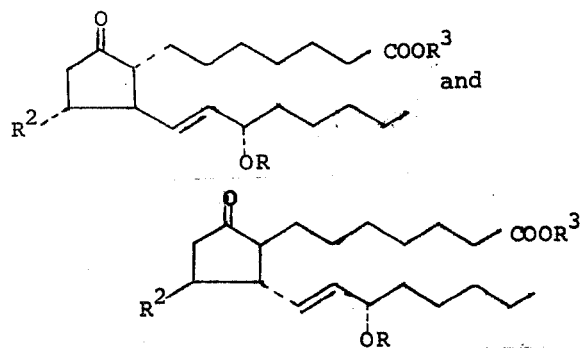

wherein R², R³ and ...OR are as defined above.

5. A process for preparing prostaglandins and prostaglandin derivatives which comprises treating a compound having the formula:

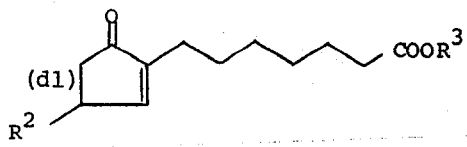

wherein R² is hydrogen or acid labile ether having from 3 through 10 carbon atoms; and R³ is lower alkyl, chloroethyl, dichloroethyl, or trichloroethyl; with a freshly prepared complexed octenol ether copper$^{(I)}$ lithium reagent composition consisting essentially of a (dl) or optically active (S) isomer mixture of compounds having the formulas:

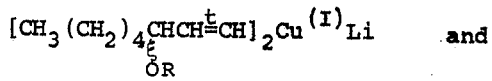

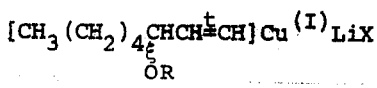

wherein ~ OR is selected from the group consisting of methoxymethoxy, 2'-methoxy-prop-2'-oxy and tetrahydropyranyl-2'-oxy; X is a halide; the t over the double bond indicates the trans configuration; and the wavy line indicates either a (dl) mixture with respect to this asymmetric center or the optically active (S) isomer; complexed by an electron-rich neutral complexing reagent, which coordinates with transition metals, in an inert organic solvent mixture, at temperatures in the range of about from −100° to −30°C for about from five minutes to 24 hours, thereby yielding the corresponding mixture of products having the formulas:

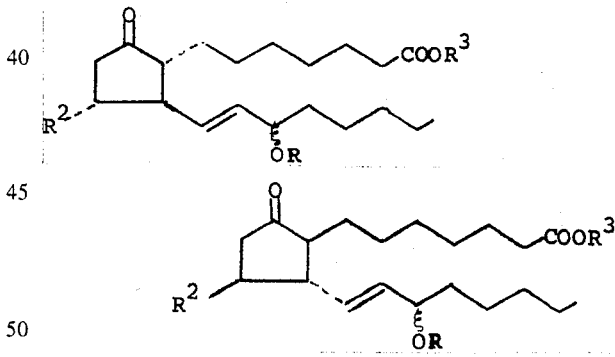

wherein R², R³ and ~ OR are as defined above.

6. The process of claim 5 wherein said complexing reagent is tetramethylethylenediamine.

7. The process of claim 5 wherein said complexing reagent is trimethyl phosphite.

8. A process for preparing prostaglandins and prostaglandin derivatives which comprises treating a compound having the formula:

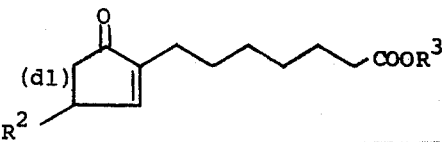

wherein R² is hydrogen or acid labile ether having from 3 through 10 carbon atoms; and R³ is lower alkyl, chloroethyl, dichloroethyl, or trichloroethyl; with a freshly prepared complexed octenol ether copper$^{(I)}$ lithium reagent composition consisting essentially of an optically active (S) isomer mixture of compounds having the formulas:

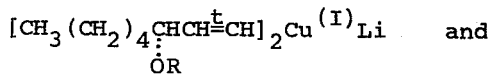

and

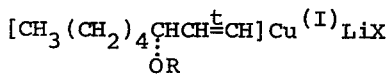

wherein ...OR is selected from the group consisting of methoxymethoxy, 2'-methoxyprop-2'-oxy, and tetrahydropyranyl-2'-oxy; X is a halide; and the $t$ over the double bond indicates the trans configuration; complexed by an electron-rich neutral complexing reagent, which coordinates with transition metals, in an inert organic solvent mixture, at temperatures in the range of about from $-100°$ to $-30°C$ for about from five minutes to 24 hours, thereby yielding the corresponding mixture of products having the formulas:

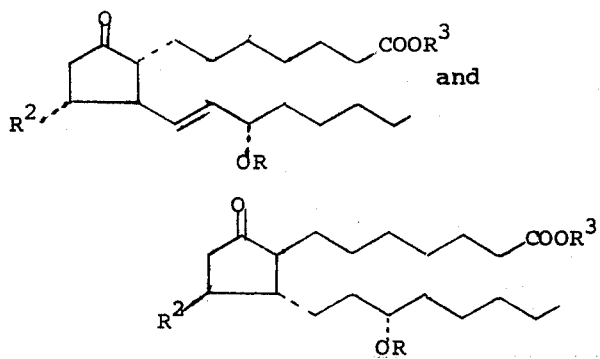

wherein $R^2$, $R^3$ and ...OR are as defined above.

9. The process of claim 8 wherein said complexing reagent is tetramethylethylenediamine.

10. The process of claim 8 wherein said complexing reagent is trimethyl phosphite.

11. A process for preparing prostaglandin derivatives which comprises treating a compound having the formula:

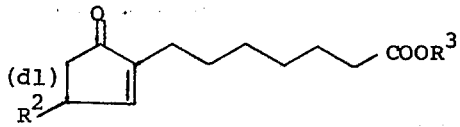

wherein $R^2$ is hydrogen or acid labile ether having from 3 through 10 carbon atoms; and $R^3$ is lower alkyl, chloroethyl, dichloroethyl, or trichloroethyl; with a complexed octenol ether copper$^{(I)}$ lithium reagent, freshly prepared by the process comprising the steps of:

a. Admixing an alkyl lithium selected from the group consisting of methyl lithium, ethyl lithium, n-propyl lithium, n-butyl lithium and mixtures thereof; and an iodooctenol ether selected from the group consisting of 3-acid labile ethers of (dl)-1-iodo-trans-1-octen-3-ol, (S)-1-iodo-trans-1-octen-3-ol, and mixtures thereof, at temperatures in the range of about from $-100°$ to $-50°C$ in an alkane solvent, having a melting point below the treatment temperature, for about from one to 60 minutes;

b. Admixing a copper$^{(I)}$ halide and a trialkyl phosphite selected from the group consisting of trimethyl phosphite, triethyl phosphite, tri(n-propyl)phosphite, triisopropyl phosphite, tri(n-butyl)phosphite, triisobutyl phosphite, and mixtures thereof, in an ether solvent having a melting point below the treatment temperature subsequently used in step (c); and c. Admixing the product mixtures of step (a) and step (b) at temperatures in the range of about from $-80°$ to $-20°C$ for about from five minutes to six hours; at temperatures in the range of about from $-100°$ to $-30°C$ for about from five minutes to 24 hours, thereby yielding the corresponding mixture of products having the formulas:

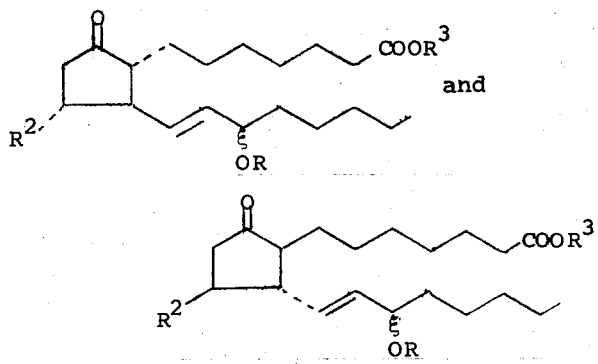

wherein $R^2$ and $R^3$ are as defined above, and $\sim$ OR corresponds to, and has the same (dl) or (S) configurations as the ether group in said complexed octenol ether copper$^{(I)}$ lithium reagent.

12. A process for preparing prostaglandin derivatives which comprises treating a compound having the formula:

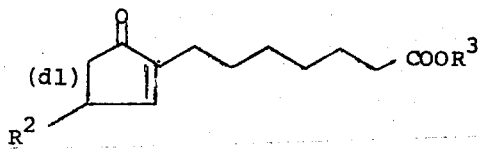

wherein $R^2$ is hydrogen or acid labile ether having from 3 through 10 carbon atoms; and $R^3$ is lower alkyl, chloroethyl, dichloroethyl, or trichloroethyl; with a complexed octenol ether copper$^{(I)}$ lithium reagent, freshly prepared by the process comprising the steps of:

a. Admixing an alkyl lithium selected from the group consisting of methyl lithium, ethyl lithium, n-propyl lithium, n-butyl lithium and mixtures thereof; and an iodooctenol ether selected from the group consisting of 3-acid labile ethers of (dl)-1-iodo-trans-1-octen-3-ol, (S)-1-iodo-trans-1-octen-3-ol, and mixtures thereof, at temperatures in the range of about from $-100°$ to $-50°C$ in an alkane solvent, having a melting point below the treatment temperature, for about from one to 60 minutes;

b. Admixing a copper$^{(I)}$ halide and a trialkyl phosphine selected from the group consisting of trimethyl phosphine, triethyl phosphine, tri(n-propyl)phosphine, triisopropyl phosphine, tri(n-butyl)phosphine, triisobutyl phosphine, and mixtures thereof, in an ether solvent having a melting point below the treatment temperature, subsequently used in step (c); and c. Admixing the product mixtures of step (a) and step (b) at temperatures in the range of about from $-80°$ to $-20°C$ for about from 5 minutes to 6 hours; at temperatures in the range of about from $-100°$ to $-30°C$ for about from five minutes to 24 hours.

thereby yielding the corresponding mixture of products having the formulas:

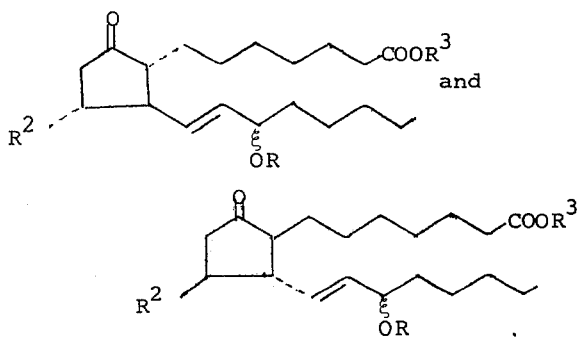

wherein $R^2$ and $R^3$ are as defined above, and ~ OR corresponds to, and has the same (dl) or (S) configuration as the ether group in said complexed octenol ether copper[(I)] lithium reagent.

13. A process for preparing prostaglandin derivatives which comprises treating a compound having the formula:

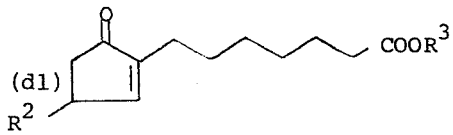

wherein $R^2$ is hydrogen or acid labile ether having from 3 through 10 carbon atoms; and $R^3$ is lower alkyl, chloroethyl, dichloroethyl, or trichloroethyl; with a complexed octenol ether copper[(I)] lithium reagent, freshly prepared by the process comprising the steps of:

a. Admixing an alkyl lithium selected from the group consisting of methyl lithium, ethyl lithium, n-propyl lithium, n-butyl lithium and mixtures thereof; and an iodooctenol ether selected from the group consisting of 3-acid labile ethers of (dl)-1-iodo-trans-1-octen-3-ol, (S)-1-iodo-trans-1-octen-3-ol, and mixtures thereof, at temperatures in the range of about from −100° to −50°C in an alkane solvent, having a melting point below the treatment temperature, for about from one to 60 minutes;

b. Dissolving bis-(trimethylphosphite) copper[(I)] iodide in an ether solvent having a melting point below the treatment temperature, subsequently used in step (c); and c. Admixing the product mixture of step (a) with the solution of step (b) at temperatures in the range of about from −80° to −20°C for about from 5 minutes to 6 hours; at temperatures in the range of about from −100° to −30°C for about from 5 minutes to 24 hours, thereby yielding the corresponding mixture of products having the formulas:

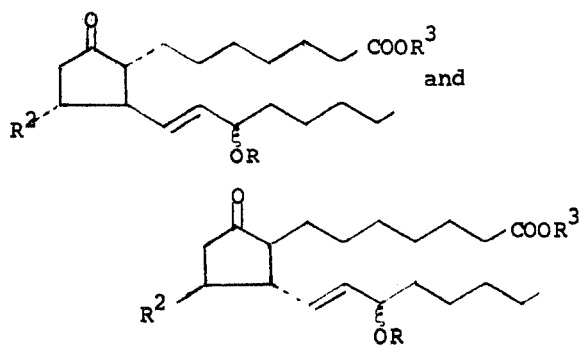

wherein $R^2$ and $R^3$ are as defined above, and ~ OR corresponds to, and has the same (dl) or (S) configuration as the ether group in said complexed octenol ether copper[(I)] lithium reagent.

14. A process for preparing prostaglandin derivatives which comprises treating a compound having the formula:

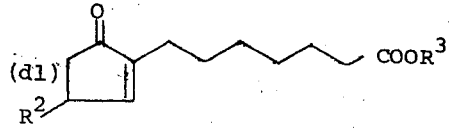

wherein $R^2$ is hydrogen or acid labile ether having from 3 through 10 carbon atoms; and $R^3$ is lower alkyl, chloroethyl, dichloroethyl, or trichloroethyl; with a complexed octenol ether copper[(I)] lithium reagent, freshly prepared by the process comprising the steps of:

a. Admixing an alkyl lithium selected from the group consisting of methyl lithium, ethyl lithium, n-propyl lithium, n-butyl lithium and mixtures thereof; and an iodooctenol ether selected from the group consisting of 3-acid labile ethers of (dl)-1-iodo-trans-1-octen-3-ol, (S)-1-iodo-trans-1-octen-3-ol, and mixtures thereof, at temperatures in the range of about from −100° to −50°C in an alkane solvent, having a melting point below the treatment temperature, for about from one to 60 minutes;

b. Admixing a tetraalkylalkylenediamine having the formula:

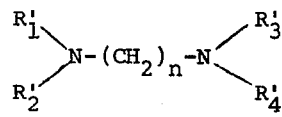

wherein $R_1'$, $R_2'$, $R_3'$, and $R_4'$ are independently selected from the group of lower alkyls having from one through four carbon atoms and n is the whole integer 2 or 3; to the product solution of step (a) at temperatures in the range of about from −100° to −50°C for about from one to 60 minutes;

c. Dissolving a copper[(I)] halide in an ether solvent having a melting point below the treatment temperature, subsequently used in step (e);

d. Cooling the solution of step (c) to about from −100° to −50°C; and e. Admixing the product solution of step (b) to the solution fo step (d) at temperatures in the range of about from −100° to −50°C; and raising the temperature of the resulting admixture to about from −50° to 0°C and maintaining temperatures within this range for about from 5 minutes to 6 hours; at temperatures in the range of about from −100° to −30°C for about from 5 minutes to 24 hours, thereby yielding the corresponding mixture of products having the formulas:

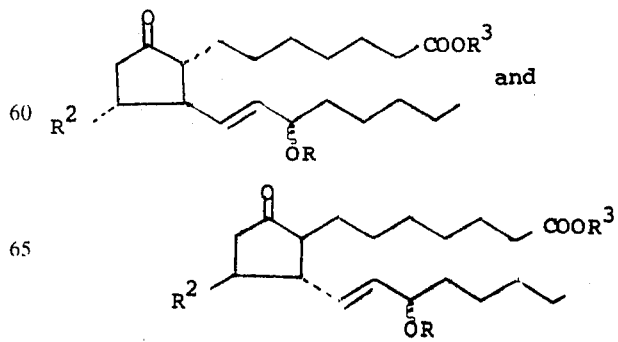

wherein $R^2$ and $R^3$ are as defined above, and $\sim$ OR corresponds to, and has the same (dl) or (S) configuration as the ether group in said complexed octenol ether copper$^{(I)}$ lithium reagent.

15. The process of claim 13 wherein $R^2$ is tetrahydropyranyl-2'-oxy and $R^3$ is methyl; and in step (a) the alkyl lithium is n-butyl lithium and the iodooctenol ether is (S)-1-iodo-3-(2'-methoxyprop-2'-oxy)-trans-1-octene.

* * * * *